United States Patent
Yang et al.

(10) Patent No.: US 10,264,560 B2
(45) Date of Patent: Apr. 16, 2019

(54) UPLINK SIGNAL TRANSMITTING METHOD AND USER EQUIPMENT, AND UPLINK SIGNAL RECEIVING METHOD AND BASE STATION

(71) Applicant: LG ELECTRONICS INC., Seoul (KR)

(72) Inventors: Suckchel Yang, Seoul (KR); Joonkui Ahn, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/540,552

(22) PCT Filed: Dec. 31, 2015

(86) PCT No.: PCT/KR2015/014592
§ 371 (c)(1),
(2) Date: Jun. 28, 2017

(87) PCT Pub. No.: WO2016/108674
PCT Pub. Date: Jul. 7, 2016

(65) Prior Publication Data
US 2018/0007681 A1    Jan. 4, 2018

Related U.S. Application Data

(60) Provisional application No. 62/135,121, filed on Mar. 18, 2015, provisional application No. 62/128,989, (Continued)

(51) Int. Cl.
*H04W 72/04*    (2009.01)
*H04L 1/18*    (2006.01)
(Continued)

(52) U.S. Cl.
CPC ...... *H04W 72/0413* (2013.01); *H04B 7/0623* (2013.01); *H04L 1/1671* (2013.01);
(Continued)

(58) Field of Classification Search
CPC ............. H04W 72/0413; H04W 72/10; H04W 72/1284; H04W 72/04; H04W 72/00406;
(Continued)

(56) References Cited

U.S. PATENT DOCUMENTS

2012/0300715 A1* 11/2012 Pelletier ............ H04W 56/0005
370/329
2014/0092792 A1* 4/2014 Kim ...................... H04L 5/0007
370/280

(Continued)

FOREIGN PATENT DOCUMENTS

WO    2014157927    10/2014

OTHER PUBLICATIONS

PCT International Application No. PCT/KR2015/014591, Written Opinion of the International Searching Authority dated Apr. 15, 2016, 20 pages.

(Continued)

*Primary Examiner* — Warner Wong
(74) *Attorney, Agent, or Firm* — Lee Hong Degerman Kang Waimey

(57) ABSTRACT

The present invention provides a method and device for transmitting/receiving an uplink signal. When a user equipment of the present invention is configured by multiple cell groups and multiple pieces of uplink control information (UCI) to be transmitted by the user equipment in a subframe are generated, the user equipment separately transmits, to the multiple cell groups, the UCI one by one from the piece
(Continued)

of UCI having the highest priority, and drops the pieces of UCI having lower priorities among the multiple pieces of UCI.

12 Claims, 13 Drawing Sheets

Related U.S. Application Data filed on Mar. 5, 2015, provisional application No. 62/109,639, filed on Jan. 30, 2015, provisional application No. 62/104,044, filed on Jan. 15, 2015, provisional application No. 62/098,342, filed on Dec. 31, 2014.

(51) Int. Cl.
*H04L 5/00* (2006.01)
*H04W 72/10* (2009.01)
*H04B 7/06* (2006.01)
*H04L 1/16* (2006.01)
*H04W 72/12* (2009.01)
*H04L 12/927* (2013.01)
*H04L 12/865* (2013.01)

(52) U.S. Cl.
CPC .............. *H04L 1/18* (2013.01); *H04L 1/1861* (2013.01); *H04L 5/0032* (2013.01); *H04L 5/0053* (2013.01); *H04W 72/10* (2013.01); *H04B 7/0626* (2013.01); *H04L 5/001* (2013.01); *H04L 5/0023* (2013.01); *H04L 5/0055* (2013.01); *H04L 5/0057* (2013.01); *H04L 47/6275* (2013.01); *H04L 47/805* (2013.01); *H04W 72/1284* (2013.01)

(58) Field of Classification Search
CPC ............ H04W 72/1278; H04W 74/002; H04L 5/0032; H04L 47/821; H04L 47/6275; H04L 47/805; H04L 51/26; H04L 67/322; H04L 2012/5651
See application file for complete search history.

(56) References Cited

U.S. PATENT DOCUMENTS

| | | | |
|---|---|---|---|
| 2014/0192738 A1 | 7/2014 | Nam et al. | |
| 2014/0192775 A1 | 7/2014 | Li et al. | |
| 2015/0124743 A1* | 5/2015 | Damnjanovic | H04W 76/025 370/329 |
| 2015/0163687 A1 | 6/2015 | Lee et al. | |
| 2015/0208366 A1* | 7/2015 | Papasakellariou | H04W 52/244 370/311 |
| 2015/0215957 A1* | 7/2015 | Yie | H04W 52/50 370/252 |
| 2015/0271761 A1* | 9/2015 | Park | H04W 52/146 370/329 |
| 2015/0282104 A1* | 10/2015 | Damnjanovic | H04W 52/365 455/522 |
| 2015/0327243 A1* | 11/2015 | Yin | H04W 52/281 370/329 |
| 2015/0341923 A1* | 11/2015 | Yang | H04W 52/146 370/329 |
| 2016/0029387 A1* | 1/2016 | Uemura | H04W 48/18 370/329 |
| 2016/0044606 A1* | 2/2016 | Yin | H04W 52/325 455/450 |
| 2016/0044655 A1* | 2/2016 | Park | H04W 72/1284 370/329 |
| 2016/0174170 A1* | 6/2016 | Yang | H04W 36/22 370/329 |
| 2017/0164296 A1* | 6/2017 | Nogami | H04W 52/146 |
| 2017/0164299 A1* | 6/2017 | Shimezawa | H04W 52/16 |
| 2017/0171786 A1* | 6/2017 | Mochizuki | H04W 36/04 |
| 2017/0195028 A1* | 7/2017 | Shimezawa | H04B 7/0626 |
| 2017/0202025 A1* | 7/2017 | Ouchi | H04W 74/0833 |
| 2017/0223694 A1* | 8/2017 | Han | H04W 16/32 |
| 2017/0295568 A1* | 10/2017 | Takeda | H04W 72/0406 |
| 2018/0007681 A1 | 1/2018 | Yang et al. | |
| 2018/0192414 A1* | 7/2018 | Takahashi | H04W 24/10 |

OTHER PUBLICATIONS

PCT International Application No. PCT/KR2015/014592, Written Opinion of the International Searching Authority dated Apr. 15, 2016, 23 pages.
Qualcomm, "Remaining details for PUCCH on SCell", 3GPP TSG RAN WG1 Meeting #78, R1-142953, Aug. 2014, 6 pages.
Huawei, "Extending PUCCH on PCell and pSCell to Carrier Aggregation", 3GPP TSG RAN WG1 Meeting #77, R1-142337, May 2014, 6 pages.
CATT, "Open issues on dual connectivity power control", 3GPP TSG RAN WG1 Meeting #78bis, R1-143746, Oct. 2014, 6 pages.
Ericsson, "Support of PUCCH on SCell", 3GPP TSG RAN WG1 Meeting #78, R1-143307, Aug. 2014, 4 pages.
Nokia, "Remaining issues of dual connectivity", 3GPP TSG RAN WG1 Meeting #78, R1-143245, Aug. 2014, 8 pages.
Huawei, "Details of reusing dual connectivity for PUCCH on SCell with CA", 3GPP TSG RAN WG1 Meeting #78, R1-142834, Aug. 2014, 9 pages.
U.S. Appl. No. 15/540,939, Office Action dated Oct. 4, 2018, 24 pages.

* cited by examiner

PUCCH format 1a and 1b structure (normal CP case)

PUCCH format 2,2a and 2b structure (normal CP case)

FIG. 10
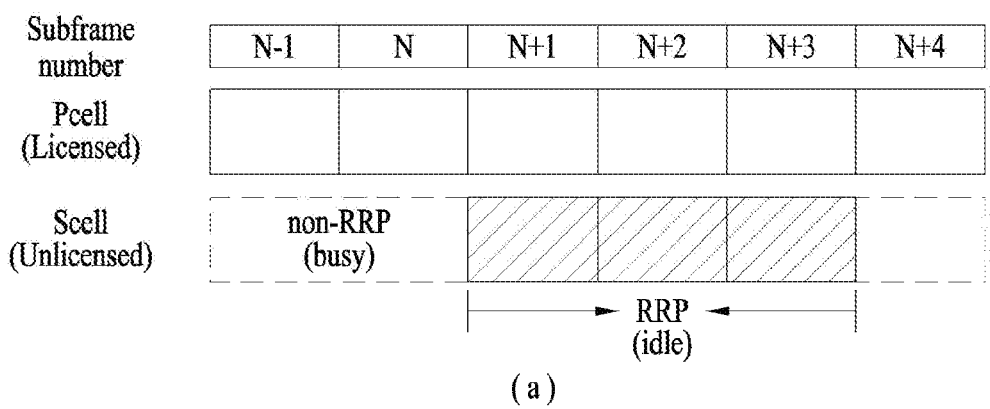
(a)
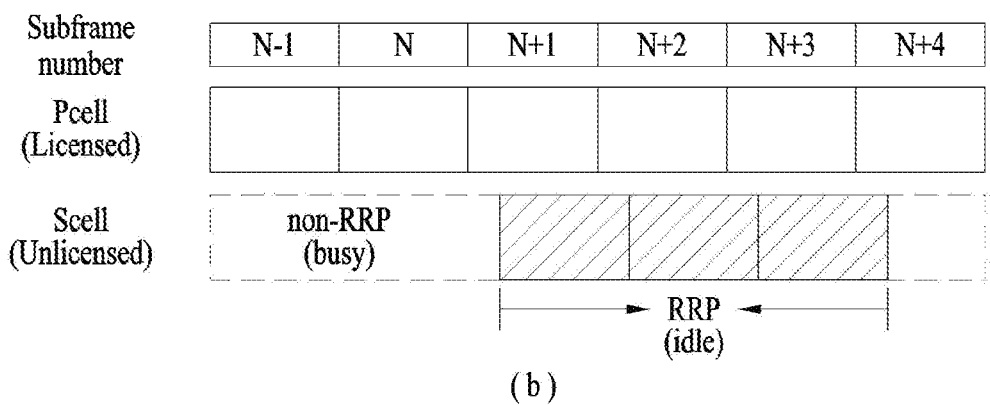
(b)

UPLINK SIGNAL TRANSMITTING METHOD AND USER EQUIPMENT, AND UPLINK SIGNAL RECEIVING METHOD AND BASE STATION

CROSS-REFERENCE TO RELATED APPLICATIONS

This application is the National Stage filing under 35 U.S.C. 371 of International Application No. PCT/KR2015/014592, filed on Dec. 31, 2015, which claims the benefit of U.S. Provisional Application No. 62/098,342, filed on Dec. 31, 2014, 62/104,044, filed on Jan. 15, 2015, 62/109,639, filed on Jan. 30, 2015, 62/128,989, filed on Mar. 5, 2015, and 62/135,121, filed on Mar. 18, 2015, the contents of which are all hereby incorporated by reference herein in their entirety.

TECHNICAL FIELD

The present invention relates to a wireless communication system, and more particularly, to a method for transmitting or receiving an uplink signal and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solutions

The present invention provides an uplink signal transmitting method, a user equipment, an uplink signal receiving method, and a base station.

When the user equipment of the present invention is configured with a plurality of cell groups, and a plurality of uplink control informations (UCIs) to be transmitted in a subframe is generated by the user equipment, the user equipment transmits the UCIs to the cell groups, respectively starting with the UCIs having the highest priority, and drops UCI(s) having a lower priority.

In one aspect of the present invention, provided herein is a method for transmitting an uplink signal by a user equipment configured with a plurality of cell groups. The method comprises: receiving, through at least one of the plurality of cell groups, UCI transmission information on a plurality of uplink control informations (UCIs) configured to be transmitted in subframe n, and transmitting at least a first UCI with a highest priority and a second UCI with a next highest priority among the UCIs in the subframe n based on the UCI transmission information.

In another aspect of the present invention, provided herein is a user equipment for transmitting an uplink signal, the user equipment configured with a plurality of cell groups and including a radio frequency (RF) unit, and a processor configured to control the RF unit. The processor may be configured to control the RF unit to receive, through at least one of the plurality of cell groups, uplink control information (UCI) transmission information on a plurality of UCIs configured to be transmitted in subframe n and to control the RF unit to transmit transmitting at least a first UCI with a highest priority and a second UCI with a next highest priority among the UCIs in the subframe n based on the UCI transmission information.

In another aspect of the present invention, provided herein is a method for receiving, by a base station, an uplink signal from a user equipment configured with a plurality of cell groups. The method comprises: transmitting, through at least one of the plurality of cell groups, UCI transmission information on a plurality of UCIs configured to be transmitted in subframe n, and receiving at least a first UCI with a highest priority and a second UCI with a next highest priority among the UCIs in the subframe n based on the UCI transmission information.

In another aspect of the present invention, provided herein is a base station for receiving an uplink signal from a user equipment configured with a plurality of cell groups, the base station including a radio frequency (RF) unit, and a processor configured to control the RF unit. The processor may be configured to control the RF unit to transmit, through at least one of the plurality of cell groups, UCI transmission information on a plurality of UCIs configured to be transmitted in subframe n and to control the RF unit to receive at least a first UCI with a highest priority and a second UCI with a next highest priority among the UCIs in the subframe n based on the UCI transmission information.

In the respective aspects of the present invention, when both the first UCI and the second UCI are configured in a first cell group, the first UCI may be transmitted on the first cell group, and the second UCI may be transmitted on a second cell group other than the first cell group.

In the respective aspects of the present invention, one of the first cell group and the second cell group may be a primary cell group having a primary cell and the second cell group may be a secondary cell group not having the primary cell but including one or more secondary cells not belonging to the primary cell group.

In the respective aspects of the present invention, information indicating a special secondary cell for transmission of a physical uplink control channel (PUCCH) among the one or more secondary cells belonging to the primary cell group may be provided to the user equipment.

In the respective aspects of the present invention, the first UCI and the second UCI may not be allowed to be transmitted simultaneously on a single physical uplink channel.

In the respective aspects of the present invention, when there is a third UCI configured in the first cell group or the second cell group in the subframe n and having a lower priority than the first UCI and the second UCI, transmission of the third UCI may be dropped.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 10 illustrates a subframe configuration of a reserved resource period (RRP).

MODE FOR CARRYING OUT THE INVENTION

Figure 1:
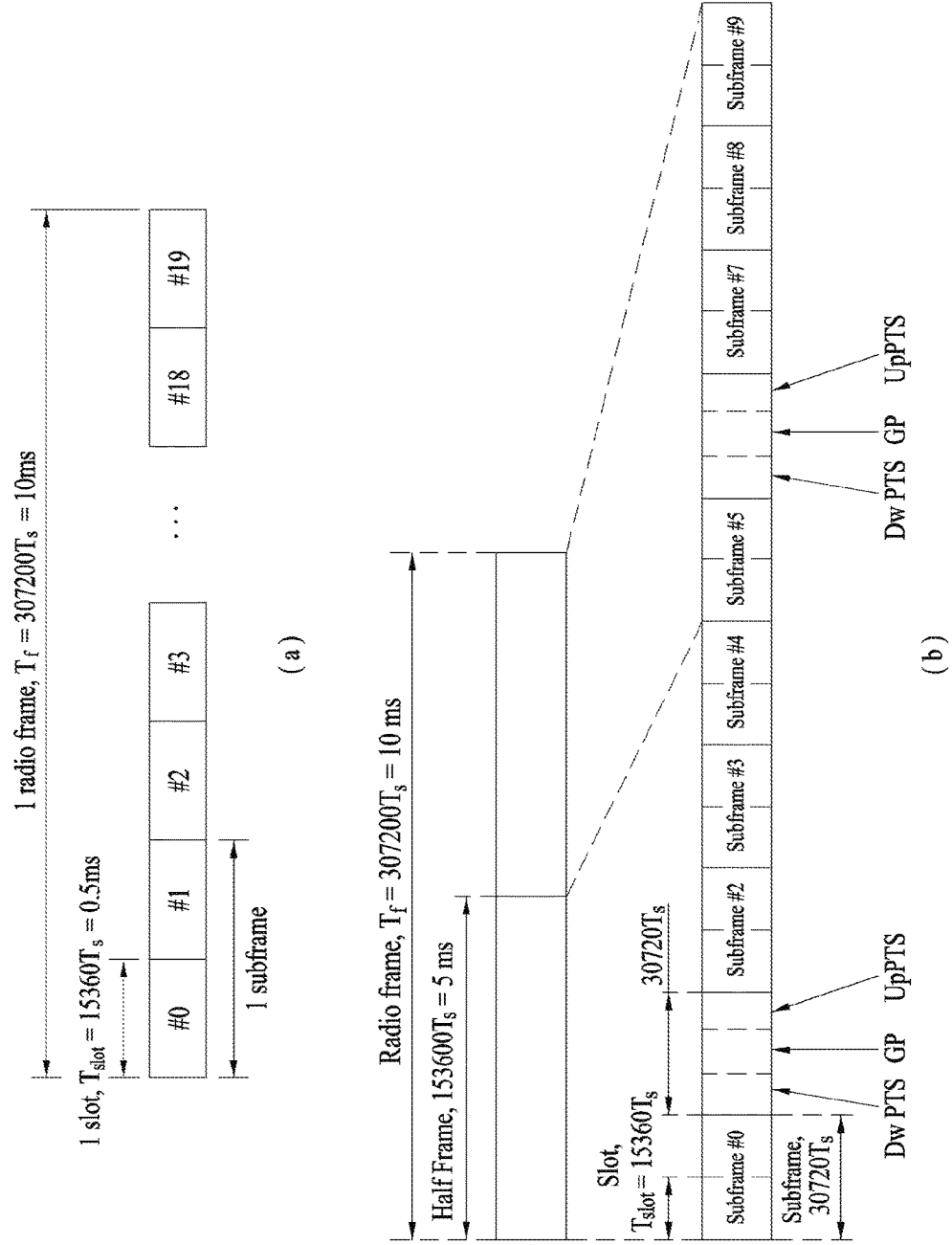
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographic region to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In a LTE/LTE-A based system, The UE may measure DL channel state received from a specific node using cell-specific reference signal(s) (CRS(s)) transmitted on a CRS resource allocated by antenna port(s) of the specific node to the specific node and/or channel state information reference signal(s) (CSI-RS(s)) transmitted on a CSI-RS resource. For details of CSI-RS configuration, see 3GPP TS 36.211 and 3GPP TS 36.331.

Meanwhile, the 3GPP LTE/LTE-A system uses the concept of a cell to manage radio resources, and the cell associated with a radio resource is distinguished from a cell of a geographical area.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described later in more detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signal.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS is assigned or configured will be referred to as CRS/DMRS/CSI-RS/SRS/UE-RS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz). Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
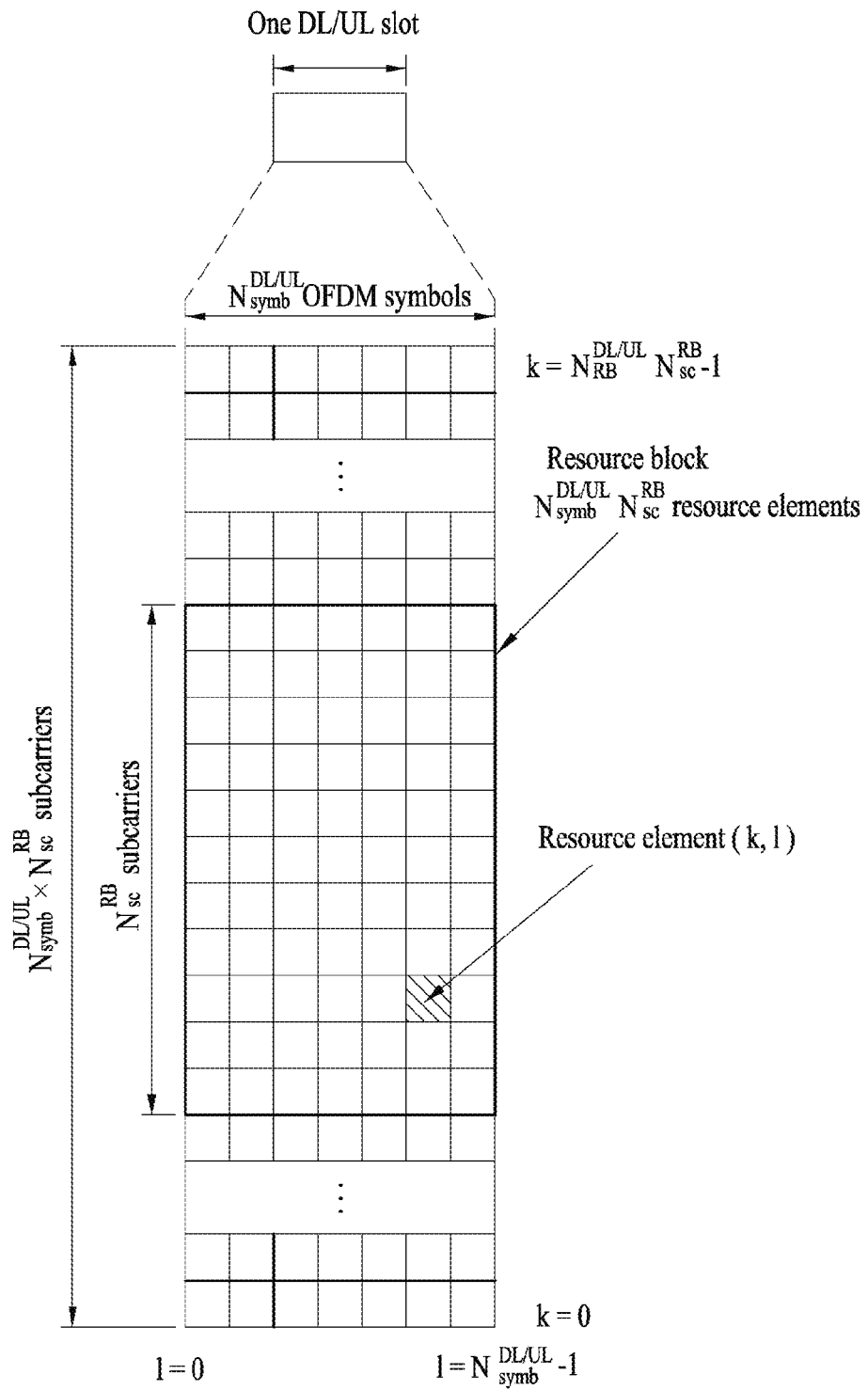
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

More specifically, upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting the SSS which is transmitted twice in one radio frame with different sequences.

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The DL carrier frequency and the corresponding system bandwidth may be acquired by the PBCH, and the UL carrier frequency and the corresponding system bandwidth may be acquired through system information, which is a DL signal. For example, the UE may acquire a SystemInformation-BlockType2 (SIB2) and determine the entire UL system band that the UE is allowed to use for UL transmission, through the UL-carrier frequency and UL-bandwidth information in the SIB2.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

The random access procedure is also called RACH (random access channel) procedure. The random access procedure is used for initial access, uplink synchronization adjustment, resource assignment, handover, etc. The random access procedure is classified into a contention-based process and a dedicated (i.e. non-contention-based) process. The contention-based random access procedure includes initial access and is normally used, whereas the dedicated random access procedure is limitedly used for handover. In the contention-based random access procedure, a UE randomly select a RACH preamble sequence. Accordingly, a plurality of UEs can simultaneously transmit the same RACH preamble sequence and thus a contention resolution procedure is not needed. In the dedicated random access procedure, a UE uses a RACH preamble sequence uniquely allocated thereto by an eNB. Accordingly, the UE can perform the random access procedure without colliding with other UEs.

The contention-based random access procedure has the following four steps. Hereinafter, messages transmitted in steps 1 to 4 may be respectively referred to as Msg 1 to Msg 4.

Step 1: RACH preamble (via PRACH) (UE to eNB)
Step 2: Random access response (RAR) (via PDCCH and PDSCH) (eNB to UE)
Step 3: Layer 2/Layer 3 message (via PUSCH) (UE to eNB)
Step 4: Contention resolution message (eNB to UE)

The dedicated random access procedure includes the following three steps. Hereinafter, uplink transmission (i.e. step 3) corresponding to a RAR may be performed as a part of the random access procedure. The dedicated random access procedure can be triggered using a PDCCH (hereinafter, referred to as PDCCH order) used for an eNB to command RACH preamble transmission.

Step 0: PACH preamble allocation through dedicated signaling (eNB to UE)
Step 1: RACH preamble (via PRACH) (UE to eNB)
Step 2: RAR (via PDCCH and PDSCH) (eNB to UE)

After transmission of RACH preamble, the UE attempts to receive a random access response (RAR) within a predetermined time window. Specifically, the UE attempts to detect a PDCCH (hereinafter, referred to as RA-RNTI PDCCH) having an RA-RNTI (Random Access RNTI) (e.g., CRC is masked with RA-RNTI in the PDCCH) within the time window. The UE checks whether a RAR therefor is present in a PDSCH corresponding to the RA-RNTI PDCCH during RA-RNTI PDCCH detection. The RAR includes timing advance (TA) information indicating timing offset information for UL synchronization, UL resource allocation information (UL grant information), a temporary UE identifier (e.g., temporary cell-RNTI, TC-RNTI), etc. The UE can perform UL transmission (e.g., Msg3) in accordance with resource allocation information and TA value in the RAR. HARQ is applied to UL transmission corresponding to the RAR. Accordingly, the UE can receive acknowledgement information (e.g., PHICH) corresponding to Msg 3 after transmission of Msg 3.

Figure 3:
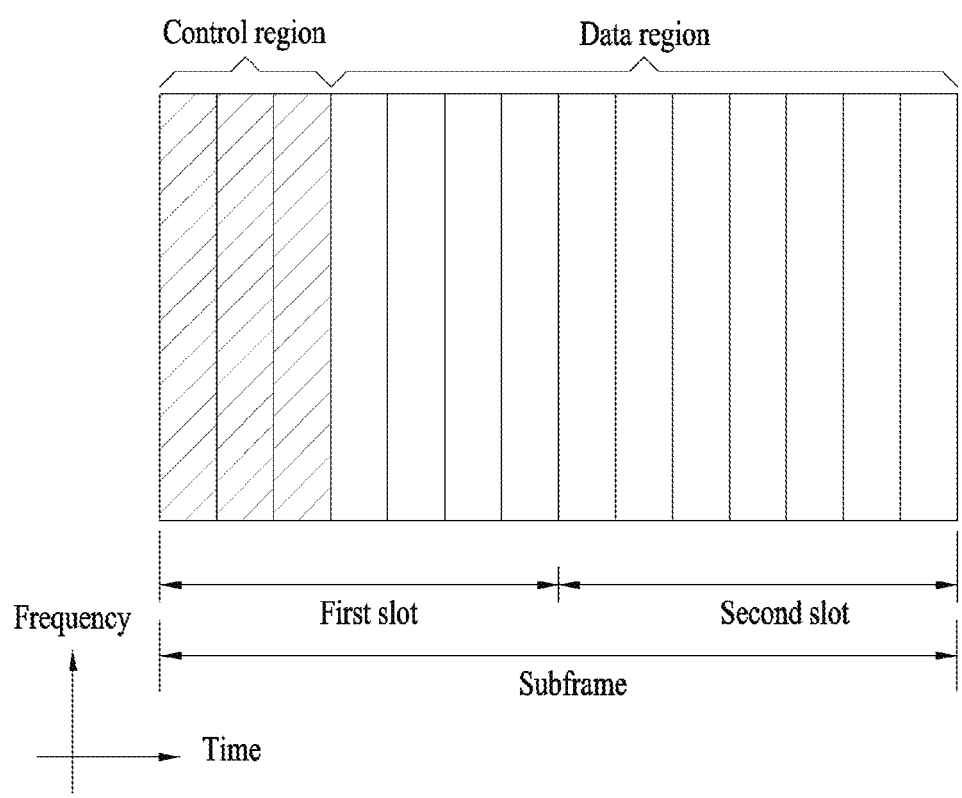
FIG. 3 illustrates the structure of a DL subframe used in a wireless communication system.

FIG. 3 illustrates the structure of a DL subframe used in a wireless communication system.

Referring to FIG. 3, a DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. The number of CCEs used for transmission of a specific PDCCH is determined by a network or the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a CCE set in which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

An eNB transmits an actual PDCCH (DCI) on a PDCCH candidate in a search space and a UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) "A" and information about data transmitted using a radio resource "B" (e.g. frequency location) and using transport format information "C" (e.g. transport block size, modulation scheme, coding information, etc.) is transmitted in a specific DL subframe. Then, the UE monitors the PDCCH using RNTI information thereof. The UE having the RNTI "A" receives the PDCCH and receives the PDSCH indicated by "B" and "C" through information of the received PDCCH.

Meanwhile, a PDCCH may be additionally allocated in the data region (e.g., resource region for PDSCH). The PDCCH allocated to the data region is referred to as EPDCCH. As shown, scheduling restriction due to the limited control channel resources of the PDCCH region may be eased by securing additional control channel resources through the EPDCCH. Like the PDCCH, the EPDCCH carries DCI. For example, the EPDCCH may carry downlink scheduling information and uplink scheduling information. For example, the UE may receive the EPDCCH and receive data/control information on a PDSCH corresponding to the EPDCCH. In addition, the UE may receive the EPDCCH and transmit data/control information on the PUSCH corresponding to the EPDCCH. Depending on the cell type, the EPDCCH/PDSCH may be allocated from the first OFDM symbol of the subframe. Unless otherwise specified, the term PDCCH herein is used to represent both PDCCH and EPDCCH.

Figure 4:
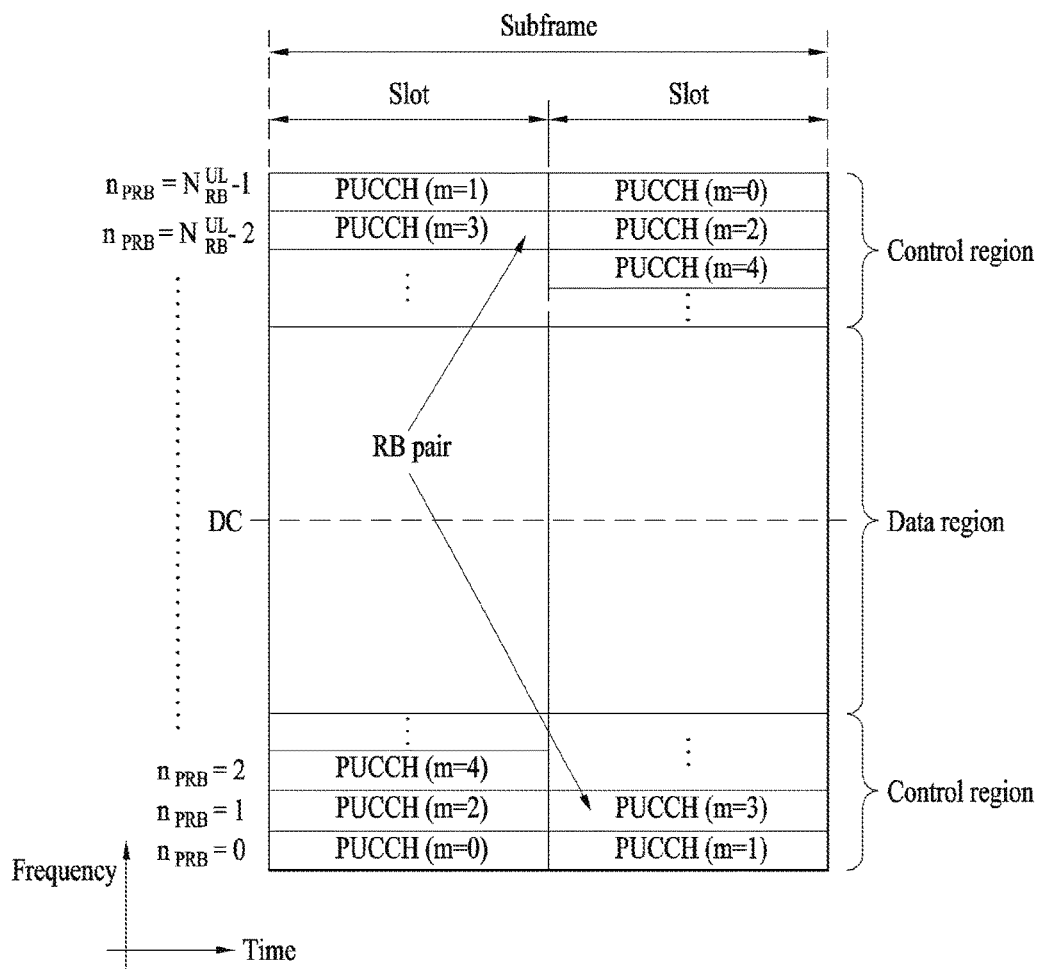
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords.

For example, the HARQ-ACK for a PDCCH or a PDSCH received in one subframe on a single carrier may be represented by 1 bit. If the UE detects the PDCCH and successfully decodes the PDSCH, it will feed back a bit (e.g., 1 b) indicating ACK. If the UE fails to detect the PDCCH or fails to decode the PDSCH, it will feed back a bit (e.g., 0 b) indicating NACK. The HARQ-ACK for PDCCHs/PDSCHs on multiple carriers or for PDCCH/PDSCHs in multiple subframes may be represented by two bits. For example, when the HARQ-ACK for the PDCCHs/PDSCHs on two carriers or in two subframes is fed back, if the PDCCH is detected either on the two carriers or in two subframes and if the PDSCH is decoded, the corresponding ACK/NACK bit may be set according to the result of decoding of the PDSCH. If the PDCCH is not detected in the other ones of the two carriers or two subframes, the corresponding HARQ-ACK corresponds to DTX, but the UE must feed back the 2-bit HARQ-ACK to the eNB. Accordingly, the UE sets the other one of the two bits of the HARQ-ACK to NACK, and feeds back the same to the eNB.

A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, multiple input multiple output (MIMO)-related feedback information includes the RI and the PMI. The RI indicates the number of streams or the number of layers that the UE can receive through the same time-frequency resource. The PMI is a value reflecting a space characteristic of a channel, indicating an index of a precoding matrix preferred by a UE for DL signal transmission based on a metric such as an SINR. The CQI is a value of channel strength, indicating a received SINR that can be obtained by the UE generally when an eNB uses the PMI.

Hereinafter, the PUCCH allocated for SR transmission is referred to as an SR PUCCH, the PUCCH allocated for transmission of HARQ-ACK is referred to as an ACK/NACK PUCCH, and the PUCCH allocated for CSI transmission is referred to as a CSI PUCCH.

Figure 5:
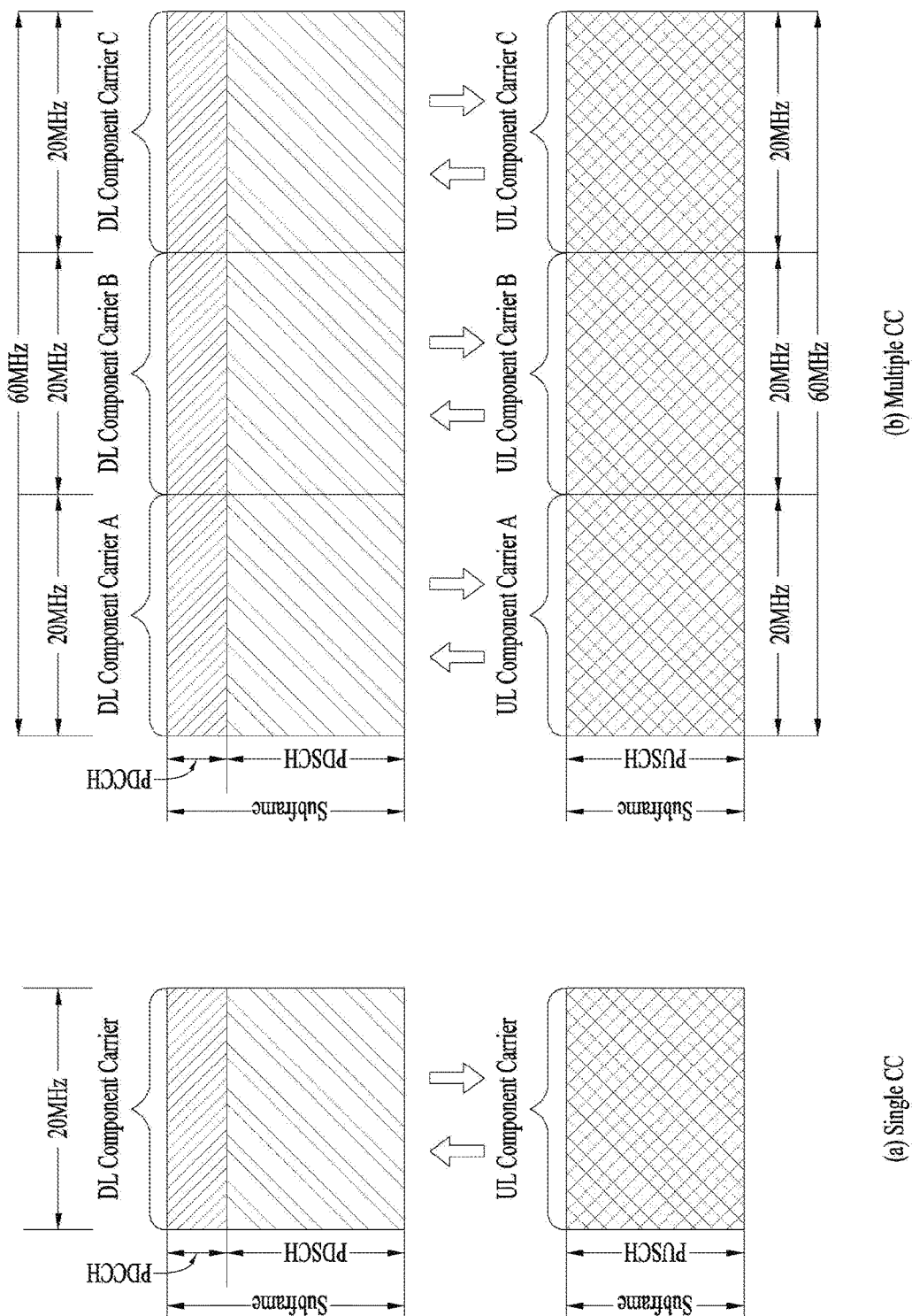
FIG. 5 is a diagram for explaining single-carrier communication and multi-carrier communication.

FIG. 5 is a diagram for explaining single-carrier communication and multi-carrier communication. Specially, FIG. 5(a) illustrates a subframe structure of a single carrier and FIG. 5(b) illustrates a subframe structure of multiple carriers.

Referring to FIG. 5(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). Referring to FIG. 5(b), three 20 MHz CCs in each of UL and DL are aggregated to support a BW of 60 MHz. The CCs may be contiguous or non-contiguous in the frequency domain. Although FIG. 5(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as Pcell, and a cell which may be activated/deactivated freely by the eNB will be referred to as Scell. The Pcell and the Scell may be identified from each other on the basis of the control information. For example, specific control information may be set to be transmitted and received through a specific cell only. This specific cell may be referred to as the Pcell, and the other cell(s) may be referred to as Scell(s).

Figure 6:
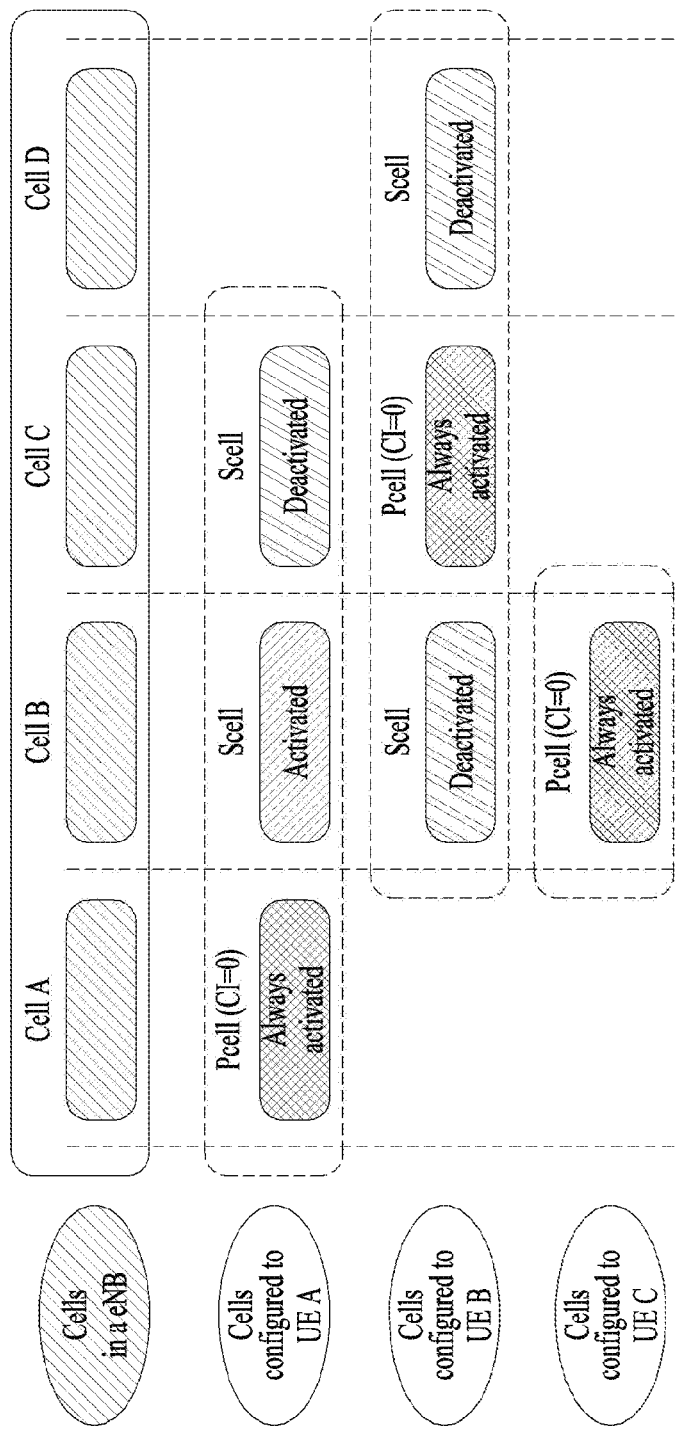
FIG. 6 illustrates the state of cells in a system supporting carrier aggregation (CA).

FIG. 6 illustrates the state of cells in a system supporting CA.

In FIG. 6, a configured cell refers to a cell in which CA is performed for a UE based on measurement report from another eNB or UE among cells of an eNB and is configured for each UE. The configured cell for the UE may be a serving cell in terms of the UE. The configured cell for the UE, i.e. the serving cell, pre-reserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. For reference, in FIG. 6, CI denotes a serving cell index and CI=0 is applied to Pcell. The serving cell index is a short ID used to identify the serving cell and, for example, any one of integers from 0 to 'maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted on one cell. In other words, in case of FDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on a DL CC linked to the specific UL CC. In case of TDD under a single carrier environment, a PDCCH for a DL grant for a PDSCH, which will be transmitted on a specific DL CC, is transmitted on the specific CC, and a PDCCH for a UL grant for a PUSCH, which will be transmitted on a specific UL CC, is transmitted on the specific CC.

On the contrary, since a plurality of serving cells may be configured in a multi-carrier system, transmission of UL/DL grant through a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted through a DL CC A, and a corresponding PDSCH may be transmitted through the DL CC B or DL CC C. For cross-CC scheduling, a carrier indicator field (CIF) may be introduced. The presence or absence of the CIF within the PDCCH may be semi-statically and UE-specifically (or UE-group-specifically) configured by higher layer signaling (e.g., RRC signaling). The baseline of PDCCH transmission is summarized as below.

CIF disabled: A PDCCH on a DL CC assigns PDSCH resources on the same DL CC or PUSCH resources on a single linked UL CC No CIF Same as an LTE PDCCH structure (same coding and same CCE-based resource mapping) and as a DCI format CIF enabled: a PDCCH on a DL CC can assign PDSCH/PUSCH resources on a specific DL/UL CC among a plurality of aggregated DL/UL CCs using a CIF.

Extended LTE DCI format with CIF

CIF (if configured) is a fixed x-bit field (e.g. x=3).

CIF (if configured) location is fixed regardless of DCI format size.

Reuse of the LTE PDCCH structure (same coding and same CCE-based resource mapping)

One or more scheduling cells may be configured for one UE and one of the scheduling cells may be a PCC which is in charge of specific DL control signaling and UL PUCCH transmission. A scheduling cell set may be configured UE-specifically, UE-group-specifically, or cell-specifically. The scheduling cell may be configured so as to directly schedule at least itself. That is, the scheduling cell may become a scheduled cell thereof. In the present invention, a cell carrying a PDCCH is referred to as a scheduling cell, a monitoring cell, or an MCC and a cell carrying a PDSCH/PUSCH scheduled by the PDCCH is referred to as a scheduled cell.

The scheduling cell includes a DL CC as a part of all carrier aggregated cells. The UE detects/decodes the PDCCH only on a corresponding DL CC. In this case, a PDSCH/PUSCH of the scheduling cell or a scheduled cell refers to a PDSCH/PUSCH configured to be transmitted on the corresponding cell. A PHICH of the scheduling cell or the scheduled cell refers to a PHICH carrying ACK/NACK for a PUSCH transmitted on the corresponding cell.

After reception/transmission of scheduling, data transmission/reception according to the scheduling, and ACK/NACK reception/transmission for the data transmission, a time delay occurs until data retransmission is performed. The time delay is generated due to a channel propagation delay or a time consumed for data decoding/encoding. Accordingly, if new data is transmitted after a HARQ process which is currently in progress is ended, a gap is created due to a time delay. In order to prevent a gap in data transmission from being created during a time delay duration, a plurality of independent HARQ processes is used. For example, when an interval between initial transmission and retransmission is 7 subframes, 7 independent HARQ processes may be performed to transmit data without a gap. A plurality of parallel HARQ processes enables successive UL/DL transmission while the eNB awaits HARQ feedback for previous UL/DL transmission. Each HARQ process is associated with a HARQ buffer of a medium access control (MAC) layer. Each HARQ process manages state parameters regarding the number of transmissions of a protocol data unit (PDU) in the buffer, HARQ feedback for a MAC PDU in the buffer, a current redundancy version, etc.

Transmission timing (or HARQ timing) of ACK/NACK for DL transmission is described below. The UE may receive a PDCCH indicating an SPS release or one or more PDSCHs in M subframes (SFs) (M≥1). Each PDSCH signal may include one or more (e.g., two) transport blocks (TB) depending on the transmission mode. If there is a PDSCH signal and/or an SPS release PDCCH signal in M DL subframes, the UE performs transmits ACK/NACK through one UL subframe corresponding to the M DL subframes through operations for ACK/NACK transmission (e.g., ACK/NACK (payload) generation, ACK/NACK resource allocation). The ACK/NACK includes reception response information about the PDSCH signal and/or the SPS release PDCCH signal. The ACK/NACK is basically transmitted through the PUCCH, but if the PUSCH is allocated at the time of ACK/NACK transmission, the ACK/NACK is transmitted through the PUSCH. When a plurality of CCs is configured for the UE, the PUCCH is transmitted only on the Pcell and the PUSCH is transmitted on the scheduled CC. Various PUCCH formats may be used for ACK/NACK transmission. Various methods such as ACK/NACK bundling, ACK/NACK channel selection (CHsel) may be used to reduce the number of ACK/NACK bits.

In the FDD, M=1. In the TDD, M is an integer greater than or equal to 1. In the TDD, the relationship between M DL subframes and a UL subframe in which the ACK/NACK is transmitted is given by a Downlink Association Set Index (DASI).

Table 3 shows DASI (K:{$k_0, k_1, \ldots, k_{M-1}$}) defined in LTE(-A). If there is a PDCCH indicating PDSCH transmission and/or SPS release (Semi-Persistent Scheduling release) in subframe n–k (k∈K), the UE transmits ACK/NACK in subframe n. In FDD, DASI (for simplicity, $d_F$)=4.

TABLE 3

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In operating in the TDD scheme, the UE must transmit ACK/NACK signals for one or more DL transmissions (e.g., PDSCH) received through M DL subframes (SF) through one UL SF. ACK/NACK for a plurality of DL SFs is transmitted through one UL SF, using the following methods.

1) ACK/NACK bundling: ACK/NACK bits for a plurality of data units (e.g., PDSCH, semi-persistent scheduling (SPS) release PDCCH, etc.) is combined by a logical operation (e.g., logical AND operation). For example, if all data units are successfully decoded, the receiving terminal (e.g., UE) transmits an ACK signal. On the other hand, if any one of the data units fails to be decoded (or detected), the UE transmits a NACK signal or transmits nothing.

2) Channel selection (CHsel): A UE receiving a plurality of data units (e.g., PDSCH, SPS release PDCCH, etc.) occupies a plurality of PUCCH resources to perform ACK/NACK transmission. The ACK/NACK response for a plurality of data units is identified by a combination of the PUCCH resource actually used for ACK/NACK transmission and the transmitted ACK/NACK content (e.g., the bit value, the QPSK symbol value). The channel selection scheme is also referred to as an ACK/NACK selection scheme and a PUCCH selection scheme.

In the 3GPP LTE/LTE-A system, there are two transmission schemes: open-loop MIMO operated without feedback of channel information and closed-loop MIMO using feedback of the channel information. In closed-loop MIMO, each of a transmitter and a receiver performs beamforming based on the channel information, i.e. CSI, to obtain a multiplexing gain of MIMO antennas. To report the CSI, time and frequency resources which can be used by the UE are controlled by then eNB. For example, the eNB commands the UE to feed back DL CSI by allocating a PUCCH or a PUSCH to the UE in order to obtain the DL CSI.

A CSI report is periodically or aperiodically configured. A periodic CSI report is transmitted by the UE on the PUCCH except for a special case (e.g. when the UE is not configured for simultaneous PUSCH and PUCCH transmission and when a PUCCH transmission timing collides with a subframe with PUSCH allocation). In the CSI, since an RI is dominantly determined by long-term fading, the RI is typically fed back to the UE from the eNB at a cycle longer than that of a PMI and CQI. In contrast, an aperiodic CSI report is transmitted on the PUSCH. The aperiodic CSI report is triggered by a CSI request field included in the DCI (e.g. DCI of DCI format 0 or 4) for scheduling of UL data (hereinafter, UL DCI format). The UE, which has decoded the UL DCI format or a random access response grant for a specific serving cell (hereinafter, serving cell c) in subframe n, performs aperiodic CSI reporting using the PUSCH in subframe n+k in serving cell c when the CSI request field is set to trigger the CSI report and when the CSI request field is not reserved. The PUSCH corresponds to a PUSCH transmitted in subframe n+k according to the UL DCI format decoded in subframe n. In the case of FDD, k=4. In the case of TDD, k is given by the following table.

TABLE 4

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | | 6 | | 4 | | | 6 | | 4 |
| 2 | | | | 4 | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

For example, when a UE for which a TDD UL/DL configuration is 6 detects the UL DCI format for serving cell c in subframe 9, the UE performs aperiodic CSI reporting triggered by the CSI request field in the detected UL DCI format on the PUSCH of serving cell c in subframe 9+5, i.e. in subframe 4 of a radio frame following a radio frame including subframe 9 in which the UL DCI format is detected.

The CSI request field is 1 bit or 2 bits in length. If the CSI request field is 1 bit, the CSI request field set to '1' triggers aperiodic CSI report for serving cell c. If the CSI request field is 2 bits, aperiodic CSI report corresponding to, for example, a value of the following table is triggered.

TABLE 5

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In the table above, an indication suggesting the serving cell(s) for which the aperiodic CSI report is triggered by the CSI request field '10' and/or the CSI request field '11' may be configured by a higher layer signal (e.g., RRC signal).

The higher layer signal may contain an 8-bit bitmap representing the cell(s) to be triggered by the CSI request field '10' and an 8-bit bitmap representing the cell(s) to be triggered by the CSI request field '11'. In each bitmap, the bits from bit 0, which is the lowest bit, to bit 7, which is the highest bit, correspond to the cells from the cell (i.e., Pcell) having the serving cell index of 0 to the cell having the serving cell index of 7 one by one. In the bitmap for the CSI request field '10', a cell corresponding to the bit set to 1 refers to a cell for which an aperiodic CSI report is triggered by the CSI request field value '10', and a cell corresponding to the bit set to 0 refers to a cell for which an aperiodic CSI report is not triggered by the CSI request field value '10'. In the bitmap for the CSI request field '11', a cell corresponding to a bit set to 1 refers to a cell for which an aperiodic CSI report is triggered by the CSI request field value '11', and a cell corresponding to a bit set to 0 refers to a cell for which an aperiodic CSI report is not triggered by the CSI request field value '11'.

Recently, CoMP technology is being considered for LTE/LTE-A systems. The CoMP technology involves a plurality of nodes. When the CoMP technology is introduced into an LTE/LTE-A system, a new transmission mode associated with the CoMP technology may be defined. There may be various configurations of the CSI-RSs received by the UE depending on how the plurality of nodes participates in communication. Therefore, in the legacy LTE system, the UE is allowed to use at most one CSI-RS configuration or CSI-RS resource configuration in which the UE should assume a non-zero transmission power for the CSI-RS. On the other hand, For a UE having CoMP configured, i.e., a UE set to the CoMP mode, the maximum number of CSI resource configurations that may be used for the UE is greater than one. If the UE is set to a mode in which one or more CSI-RS resource configurations may be configured, namely, if the UE is set to the CoMP mode, the UE may receive a higher layer signal containing information about one or more CSI-RS resource configurations. If not only the CoMP but also the carrier aggregation (CA) is configured for the UE, one or more CSI-RS resource configurations may be used for each serving cell.

In the legacy LTE/LTE-A system, the UE transmits/receives signals to/from one node on a specific serving cell. That is, since there is only one radio link on one serving cell in the legacy LTE/LTE-A system, only one CSI for one serving cell may be calculated by the UE. On the other hand, in the CoMP involving a plurality of nodes, the DL channel state may differ among the nodes or combinations of nodes. Since the CSI-RS resource configuration may vary depending on the nodes or combinations of nodes, the CSI is associated with the CSI-RS resource. In addition, the channel state may vary depending on the interference environment between nodes participating in CoMP. In other words, if CoMP is configured, the state may be measured by UE for each node or combination of nodes, and CSI may be given for each interference environment. Therefore, the maximum number of CSIs that may be calculated for each serving cell of UE may be an integer larger than one. How the UE should report a CSI in order for the UE to obtain CSI may be configured by the higher layer. When CoMP is configured, one or more CSIs may be calculated by the UE. Thus, if the UE is set to the CoMP mode, a CSI report for one or more CSIs per serving cell of the UE may be configured to implement periodic or aperiodic CSI reporting.

As mentioned above, CSI in CoMP is associated with a CSI-RS resource used for channel measurement and a resource used for interference measurement (hereinafter, interference measurement (IM) resource). Hereinafter, an association of one CSI-RS resource for signal measurement and one IM resource for interference measurement is referred to as a CSI process. That is, the CSI process may be associated with one CSI-RS resource and one IM resource (IMR).

Preferably, an eNB (hereinafter, a serving eNB) to which the UE is connected or which manages a node of a cell where the UE is positioned does not transmit any signal on an IM resource. Thus, the IM resource may be configured for the UE in a manner similar to the zero-power CSI-RS. For example, the eNB may inform the UE of the resource elements used for interference measurement using a 16-bit bitmap indicating the zero power CSI-RS pattern described above and CSI-RS subframe configurations. When the IM resource is explicitly configured for the UE, the UE measures the interference on the IM resource and calculates the CSI assuming that the interference is interference on the CSI reference resource on which the CSI measurement is based. More specifically, the UE may perform channel measurements based on the CSI-RS or CRS and perform interference measurement based on the IM resources to obtain CSI based on the channel measurement and the interference measurement.

Therefore, one CSI reported by the UE may correspond to one CSI process. Each CSI process may have an independent CSI feedback configuration. The independent feedback configuration refers to a feedback mode, a feedback period, a feedback offset, and the like. The feedback offset corresponds to the start subframe with feedback among the subframes in a radio frame. The feedback mode may be defined differently depending on whether the CQI included in the CSI that is fed back among RI, CQI, PMI and TPMI is a CQI for a wideband, a CQI for a subband, or a CQI for a subband selected by the UE, and whether the CSI includes the PMI and whether the CSI includes a single PMI or a plurality of PMIs.

If the CSI Request field is configured with 2 bits and the UE is set to a mode (in Transmission Mode 10) in which one or more CSI processes may be configured for at least one cell, an aperiodic CSI report corresponding to the values in the following table is triggered. The following table shows the CSI request field for the PDCCH/EPDCCH with an uplink DCI format in the UE specific search space.

TABLE 6

| Value of CSI request field | Description |
| --- | --- |
| '00' | No aperiodic CSI report is triggered |
| '01' | Aperiodic CSI report is triggered for a set of CSI process(es) configured by higher layers for serving cell c |
| '10' | Aperiodic CSI report is triggered for a 1$^{st}$ set of CSI process(es) configured by higher layers |
| '11' | Aperiodic CSI report is triggered for a 2$^{nd}$ set of CSI process(es) configured by higher layers |

In the above table, an indication for CSI cell(s) for which the aperiodic CSI report is triggered by the CSI request field '01', the CSI request field '10' and/or the CSI request field '11' may be configured by a higher layer signal (e.g., an RRC signal). When a CSI process is configured for the serving cell by a higher layer, whether or not an aperiodic CSI report is triggered by the CSI request field '01', the CSI request field '10' and the CSI request field '11' is configured. Trigger 01 for the CSI process indicates whether the corresponding CSI process is triggered by the CSI request field set to '01', trigger 10 indicates whether the corresponding CSI process is triggered by the CSI request field set to '10', and trigger 11 indicates whether the corresponding CSI process is triggered by the CSI request field set to '11'. According to Trigger 01, Trigger 10 and Trigger 11 for the CSI process, the corresponding CSI process may be triggered by all, none or some of the CSI request field '01', the CSI request field '10' and the CSI request field '11'.

The higher layer signal may contain an 8-bit bitmap indicating the cell(s) to be triggered by the CSI request field '10' and an 8-bit bitmap indicating the cell(s) to be triggered by the CSI request field '11'. In each bitmap, the bits from bit 0, which is the lowest bit, to bit 7, which is the highest bit, correspond to the cells from the cell (i.e., Pcell) having the serving cell index of 0 to the cell having the serving cell index of 7 one by one. In the bitmap for the CSI request field '10', a cell corresponding to the bit set to 1 refers to a cell for which an aperiodic CSI report is triggered by the CSI request field value '10', and a cell corresponding to the bit set to 0 refers to a cell for which an aperiodic CSI report is not triggered by the CSI request field value '10'. In the bitmap for the CSI request field '11', a cell corresponding to a bit set to 1 refers to a cell for which an aperiodic CSI report is triggered by the CSI request field value '11', and a cell corresponding to a bit set to 0 refers to a cell for which an aperiodic CSI report is not triggered by the CSI request field value '11'.

Figure 7:
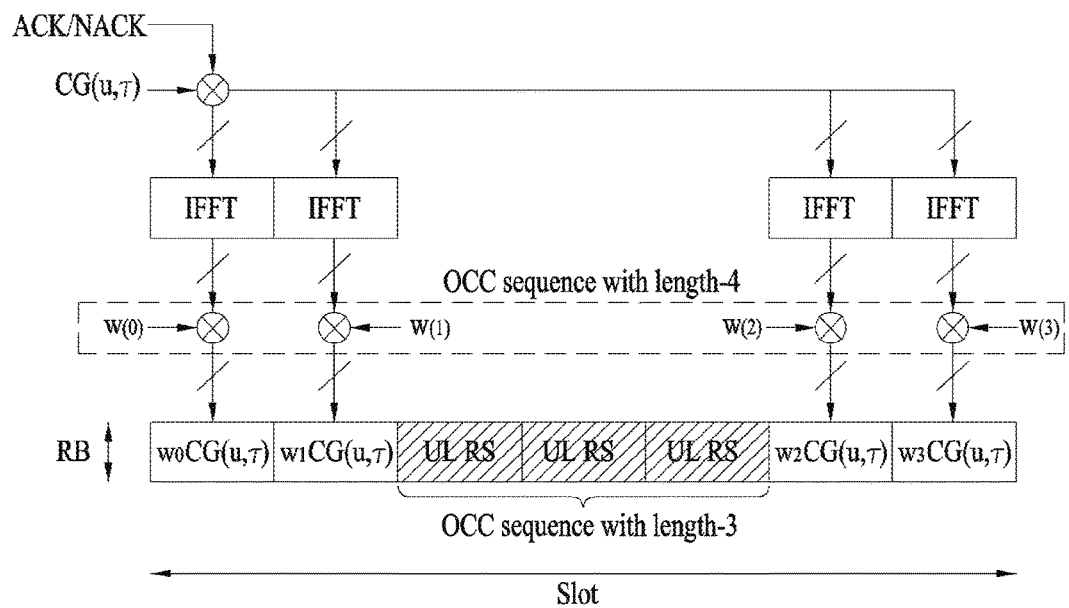
FIGS. 7 to 9 illustrate an example of physically mapping a PUCCH format to a PUCCH resource.
Figure 8:
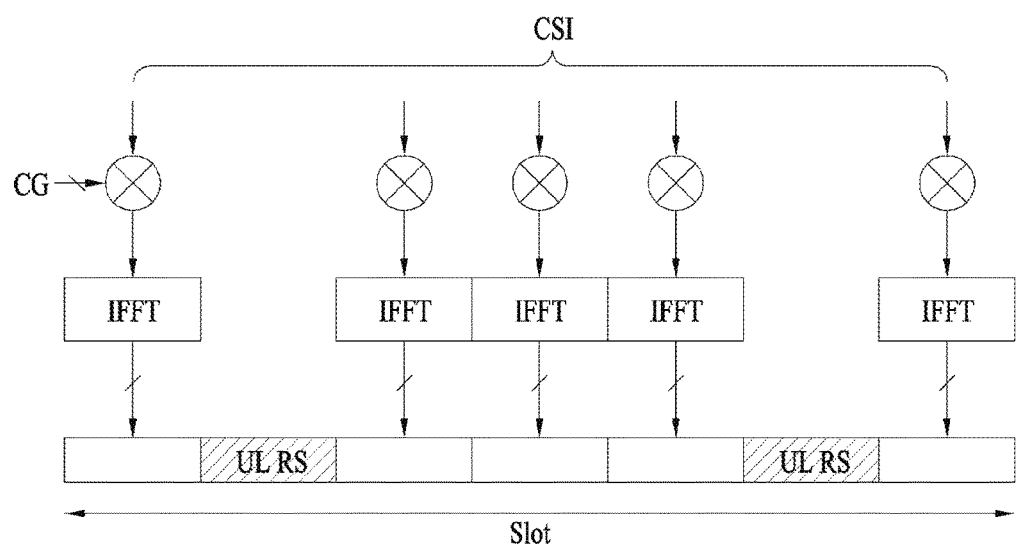
Figure 9:
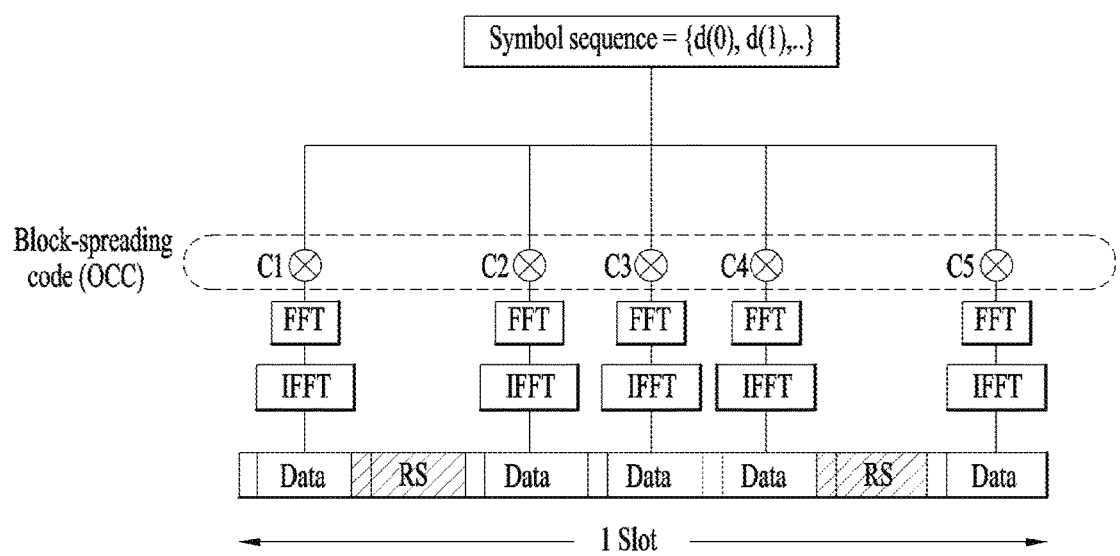
Figure 11:
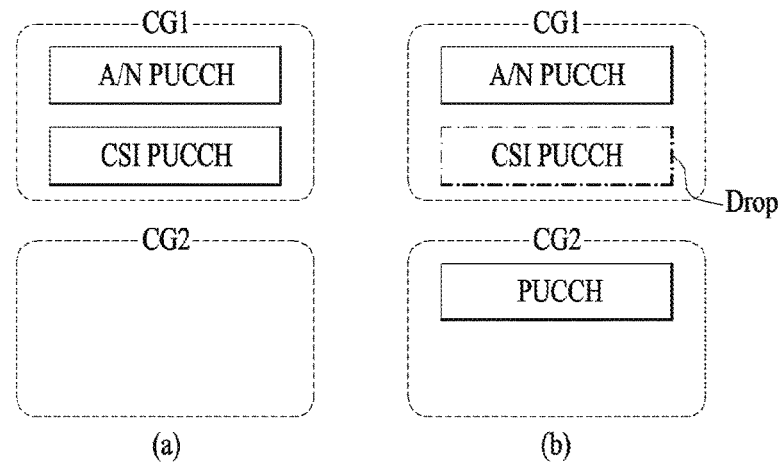
FIGS. 11 to 14 illustrate transmission of uplink control information (UCI) according to embodiments of the present invention.

FIGS. 7 to 9 illustrate an example of physically mapping a PUCCH format to a PUCCH resource.

FIG. 7 exemplarily shows slot level structures of a PUCCH format. Particularly, FIG. 7 shows the PUCCH format 1a and 1b structure in case of a normal CP.

In the PUCCH format 1a and 1b structure, the same control information is repeated per slot within a subframe. In each UE, the ACK/NACK signal may be transmitted through different resources that are comprised of different cyclic shifts (i.e., different frequency domain codes) of a Computer-Generated Constant Amplitude Zero Auto Correlation (CG-CAZAC) sequence and different resources composed of orthogonal cover or orthogonal cover code (OC or OCC). For example, OC may include a Walsh/DFT orthogonal code. Provided that the number of CSs is 6 and the number of OCs is 3, a total of 18 UEs may be multiplexed in the same PRB on the basis of one antenna. Orthogonal sequences [w(0) w(1) w(2) w(3)] may be applied to either an arbitrary time domain (after FFT modulation) or an arbitrary frequency domain (before FFT modulation).

For an SR and persistent scheduling, ACK/NACK resources including CSs, OC sequences, and PRBs may be provided to a UE through RRC. For dynamic ACK/NACK and non-persistent scheduling, ACK/NACK resources may be implicitly provided to the UE by the lowest Control Channel Element (CCE) index of a PDCCH corresponding to a PDSCH.

FIG. 8 illustrates an example of transmitting channel state information using PUCCH format 2/2a/2b in a UL slot having a normal CP.

Referring to FIG. 8, in the case of a normal CP, one UL subframe consists of 10 OFDM symbols except a symbol carrying a UL reference signal (RS). The channel state information is coded into 10 transmission symbols (also referred to as complex modulation symbols) through block coding. The 10 transmission symbols are respectively mapped to the 10 OFDM symbols and transmitted to the eNB.

FIG. 9 illustrates a PUCCH format based on block spreading.

A block spreading scheme is to transmit a symbol sequence after spreading the symbol sequence in the time domain by an orthogonal cover code (OCC) (also called an orthogonal sequence). According to the block spreading scheme, control signals of multiple UEs may be multiplexed in the same RB by the OCC and then transmitted to an eNB. In PUCCH format 2, one symbol sequence is transmitted in the time domain, wherein UCI of the UEs is multiplexed using a cyclic shift of a CAZAC sequence (i.e. CCS) and then transmitted to the eNB. On the other hand, in a block spreading based new PUCCH format (hereinafter, PUCCH format 3), one symbol sequence is transmitted in the frequency domain, wherein the UCI of the UEs is multiplexed using OCC based time-domain spreading and then transmitted to the eNB. Referring to FIG. 9 as an example, one symbol sequence is spread by a length-5 (i.e. SF=5) OCC and then mapped to 5 SC-FDMA symbols. Although a total of 2 RS symbols is used during one slot in FIG. 9, 3 RS symbols may be used and an OCC of SF=4 may be used for spreading of the symbol sequence and multiplexing of the UEs. Here, the RS symbols may be generated from a CAZAC sequence having a specific cyclic shift and may be transmitted in a form of applying (multiplying) a specific OCC to a plurality of RS symbols in the time domain. In FIG. 9, fast Fourier transform (FFT) may be applied in advance before the OCC and discrete Fourier transform (DFT) may be applied instead of FFT.

For convenience of description, such a channel coding based scheme for transmitting a plurality of ACK/NACK signals using PUCCH format 2 or PUCCH format 3 is referred to as a "multi-bit ACK/NACK coding" transmission method. This method indicates a method for transmitting an ACK/NACK coded block generated by channel-coding ACK/NACK information or DTX information (indicating that a PDCCH has not been received/detected) for PDSCH(s) of multiple DL CCs, i.e. PDSCH(s) transmitted on multiple DL CCs. For example, if the UE receives two codewords (CWs) by operating in a single user MIMO (SU-MIMO) mode on any DL CC, the UE may transmit one of a total of 4 feedback states of ACK/ACK, ACK/NACK, NACK/ACK, and NACK/NACK per CW on the DL CC or one of a maximum of 5 feedback states including DTX. If the UE receives a single CW, there may be a maximum of 3 states of ACK, NACK, and DTX (if NACK and DTX are identically processed, there may be a total of two states of ACK and NACK/DTX). Accordingly, if a maximum of 5 DL CCs are aggregated for the UE and the UE operates in an SU-MIMO mode on all CCs, there may be a maximum of $5^5$ transmittable feedback states and the size of an ACK/NACK payload for representing these states is a total of 12 bits. If DTX and NACK are identically processed, the number of feedback states is $4^5$ and the size of the ACK/NACK payload for representing these states is a total of 10 bits.

As illustrated in FIGS. 7 to 9, the UCI carried by one PUCCH differs in size and usage according to the PUCCH format, and the size thereof may vary according to the coding rate. The following table illustrates the mapping relationship between the PUCCH formats and the UCI.

For example, the following PUCCH formats may be defined.

TABLE 7

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to the table, the PUCCH format 1 series is mainly used to transmit ACK/NACK information, and the PUCCH format 2 series is mainly used to carry channel state information (CSI) such as CQI/PMI/RI, and the PUCCH format 3 series is mainly used to transmit ACK/NACK information.

The UE is allocated a PUCCH resource for transmission of UCI from an eNB by a higher layer signal, a dynamic control signal, or in an implicit manner. The physical resources used for PUCCH depends on two parameters, $N^{(2)}_{RB}$ and $N^{(1)}_{cs}$, given by higher layers. Variable $N^{(2)}_{RB} \geq 0$ denotes the bandwidth available for PUCCH format 2/2a/2b transmission in each slot, expressed as an integer multiple of $N^{RB}_{sc}$. The variable $N^{(1)}_{cs}$ denotes the number of cyclic shift used for PUCCH formats 1/1a/1b in a resource block used for a mix of formats 1/1a/1b and 2/2a/2b. The value of $N^{(1)}_{cs}$ is an integer multiple of $\Delta^{PUCCH}_{shift}$ within the range of {0, 1, . . . , 7}, $\Delta^{PUCCH}_{shift}$ is provided by higher layers. No mixed resource block is present if $N^{(1)}_{cs}=0$. At most one resource block in each slot supports a mix of formats 1/1a/1b and 2/2a/2b. Resources used for transmission of PUCCH formats 1/1a/1b, 2/2a/2b and 3 are represented by the non-negative indices $n^{(1,p)}_{PUCCH}$, $n^{(2,p)}_{PUCCH} < N^{(2)}_{RB} N^{RB}_{sc} + \text{ceil}(N^{(1)}_{cs}/8) \cdot (N^{RB}_{sc} - N^{(1)}_{sc} - 2)$, and $n^{(3,p)}_{PUCCH}$, respectively.

Specifically, an orthogonal sequence and/or a cyclic shift to be applied to corresponding UCI is determined from a PUCCH resource index according to a specific rule predefined for each PUCCH format, and resource indexes of two resource blocks in a subframe to which a PUCCH is mapped are given. For example, the PRBs to be used for transmission of PUCCH in $n_s$ are given by the following equation.

$$n_{PRB} = \begin{cases} \left\lfloor \frac{m}{2} \right\rfloor & \text{if } (m + n_s \text{ mod } 2) \text{mod } 2 = 0 \\ N^{UL}_{RB} - 1 - \left\lfloor \frac{m}{2} \right\rfloor & \text{if } (m + n_s \text{ mod } 2) \text{mod } 2 = 1 \end{cases} \quad \text{Equation 1}$$

where the variable m depends on the PUCCH format. PUCCH format 1/1a/1b, PUCCH format 2/2a/2b, and PUCCH format 3 are given by Equation 2, Equation 3 and Equation 4, respectively.

$$m = \begin{cases} N_{RB}^{(2)} & \text{if } n_{PUCCH}^{(1,\tilde{p})} < c \cdot N_{cs}^{(1)} / \Delta_{shift}^{PUCCH} \\ \left\lfloor \dfrac{n_{PUCCH}^{(1,\tilde{p})} - c \cdot N_{cs}^{(1)} / \Delta_{shift}^{PUCCH}}{c \cdot N_{sc}^{RB} / \Delta_{shift}^{PUCCH}} \right\rfloor + N_{RB}^{(2)} + \left\lceil \dfrac{N_{cs}^{(1)}}{8} \right\rceil & \text{otherwise} \end{cases}$$

Equation 2

$$c = \begin{cases} 3 & \text{normal cyclic prefix} \\ 2 & \text{extended cyclic prefix} \end{cases}$$

In Equation 2, $n^{(1,\tilde{p})}_{PUCCH}$ is a PUCCH resource index of an antenna port p for PUCCH format 1/1a/1b. For ACK/NACK PUCCH, it is implicitly determined by the first CCE index of the PDCCH carrying scheduling information on the corresponding PDSCH.

$$m = \lfloor n_{PUCCH}^{(2,\tilde{p})}/N_{sc}^{RB} \rfloor \quad \text{Equation 3}$$

$n^{(2)}_{PUCCH}$ is a PUCCH resource index of an antenna port p for PUCCH format 2/2a/2b, and the value thereof is transmitted from the eNB to the UE by higher layer signaling.

$$m = \lfloor n_{PUCCH}^{(3,\tilde{p})}/N_{SF,0}^{PUCCH} \rfloor \quad \text{Equation 4}$$

$n^{(3)}_{PUCCH}$ is a PUCCH resource index of an antenna port p for PUCCH format 2/2a/2b, and the value thereof is transmitted from the eNB to the UE by higher layer signaling. $N^{PUCCH}_{SF,0}$ denotes the spreading factor (SF) for the first slot of a subframe. $N^{PUCCH}_{SF,0}$ is 5 for both 2 slots in a subframe using general PUCCH format 3. $N^{PUCCH}_{SF,0}$ is 5 and 4 for the first and second slots in a subframe using reduced PUCCH format 3.

Referring to Equation 2, a PUCCH resource for ACK/NACK is not pre-allocated to each UE, and but a plurality of PUCCH resources is allocated to a plurality of UEs in a cell at every point of time. Specifically, a PUCCH resource used by the UE to transmit the ACK/NACK is dynamically determined based on the PDCCH carrying the scheduling information on the PDSCH carrying the corresponding downlink data or the PDCCH indicating SPS release. A region in which the PDCCH is transmitted in each DL subframe includes a plurality of control channel elements (CCEs), and the PDCCH transmitted to the UE consists of one or more CCEs. The UE transmits ACK/NACK through a PUCCH resource linked to a specific CCE (for example, the lowest index CCE) among the CCEs constituting the PDCCH that the UE has received.

Each PUCCH resource index corresponds to a PUCCH resource for ACK/NACK. For example, when it is assumed that the scheduling information on the PDSCH is transmitted to the UE through a PDCCH consisting of the CCEs #4 to #6 and the CCE #4 is linked to the PUCCH resource index 4, the UE transmits an ACK/NACK for the PDSCH to the eNB through PUCCH resource #4 corresponding to CCE #4. Specifically, the PUCCH resource index for transmission by two antenna ports ($p_0$ and $p_1$) in the 3GPP LTE(-A) system is determined as follows.

$$n^{(1,\tilde{p}=\tilde{p}0)}_{PUCCH} = n_{CCE} + N^{(1)}_{PUCCH} \quad \text{Equation 5}$$

$$n^{(1,\tilde{p}=\tilde{p}1)}_{PUCCH} = n_{CCE} + 1 + N^{(1)}_{PUCCH} \quad \text{Equation 6}$$

Here, $n^{(1,\tilde{p}=\tilde{p}0)}_{PUCCH}$ denotes a PUCCH resource index (i.e. number) to be used by antenna port $p_0$, $n^{(1,\tilde{p}=\tilde{p}1)}_{PUCCH}$ denotes a PUCCH resource index to be used by antenna port $p_1$, and $N^{(1)}_{PUCCH}$ denotes a signaling value received from higher layer. $n_{CCE}$ is the lowest of CCE indexes used for PDCCH transmission. For example, when the CCE aggregation level is higher than or equal to 2, the first CCE index among indexes of a plurality of aggregated CCEs for PDCCH transmission is used in determining an ACK/NACK PUCCH resource. The cyclic shift (CS), orthogonal code (OC) and PRB for the PUCCH format are obtained from $n^{(1)}_{PUCCH}$.

When PUCCH format 3 is configured for ACK/NACK transmission, a specific one of the PUCCH format 3 resource indexes ($n^{(3)}_{PUCCH}$) allocated by an higher layer (e.g., RRC) may be indicated by an ACK/NACK resource indicator (ARI) value of the DL grant PDCCH (explicit PUCCH resource). The ARI is transmitted through the TPC field of the PDCCH that schedules PDSCH of the Scell. The OC and PRB for PUCCH format 3 are obtained from $n^{(3)}_{PUCCH}$.

In the case of EPDCCH-based scheduling, the ACK/NACK transmission resource for the DL data scheduled by the DL grant EPDCCH may be determined as a PUCCH resource linked to a specific ECCE index (e.g., minimum ECCE index) constituting the DL grant EPDCCH and an ECCE index obtained by adding a specific offset value to the specific ECCE index. In addition, the ACK/NACK feedback transmission resource may be determined as a PUCCH resource linked to a specific ECCE index (e.g., a minimum ECCE index) constituting the DL grant EPDCCH or a PUCCH resource obtained by adding a specific offset value to the specific ECCE index. Here, the specific offset value may be determined by a value directly signaled through the ARO (ACK/NACK Resource Offset) field in the DL grant EPDCCH and/or a value designated dedicatedly for each antenna port. Specifically, the information signaled through the TPC field and the ARO field in the DL grant EPDCCH according to the frame structure type (e.g., FDD or TDD) and the ACK/NACK feedback transmission scheme (e.g., PUCCH format 3 or channel selection) may be configured as follows. For simplicity, the TPC command for PUCCH power control is defined as "TPC value", an offset value added in determining an implicit PUCCH index is defined as "ARO value", and the ARI indicating a specific one of a plurality of PUCCH format 3 indexes or a plurality of PUCCH format 1 indexes (a plurality of PUCCH format 1 index groups) allocated through RRC is defined "ARI value". A fixed value (e.g., '0') that is inserted without any information (for use such as virtual CRC) is defined as a "fixed value".

The remaining PUCCH resource(s) for SR, ACK/NACK and/or CSI other than the (ACK/NACK) PUCCH resource(s) determined dynamically (i.e., implicitly) on the Pcell in the UL subframe corresponding to the ACK/NACK transmission timing for the DL subframe by detecting the PDCCH/EPDCCH on the Pcell in the DL subframe are configured by a higher layer.

Not only aggregation of a plurality of CCs having the same UL-DL subframe configuration but also aggregation of a plurality of CCs having different UL-DL subframe configurations is possible. For example, aggregation of multiple CCs with different UL-DL subframe configurations includes aggregation of multiple CCs configured with different UL- DL configurations (for simplicity, referred to as different TDD CAs) and aggregation of TDD CCs and FDD CCs.

Cross-CC scheduling may be supported even when multiple CCs with different subframe configurations are aggregated. In this case, the HARQ timing configured for the scheduling CC and the HARQ timing configured for the scheduled CC may be different from each other. Therefore, in order to perform, through the scheduling CC, UL grant and/or PHICH transmission for the UL data transmitted on the scheduling CC UL SF and the cross-CC scheduled CC UL SF, the same HARQ timing or different HARQ timings (configured in a specific UL-DL configuration) may be applied to the respective CCs, or the HARQ timing configured in a specific UL-DL configuration may be commonly applied to all CCs (i.e., PCCs (or scheduling CCs)/SCCs) is. A specific UL-DL configuration (hereinafter, a reference configuration (Ref-Cfg)) may be the same as a UL-DL configuration (MCC-Cfg) configured for a PCC (or a scheduling CC) or a UL-DL configuration (SCC-Cfg) configured for an SCC, or may be determined as another UL-DL configuration. Herein, the UL grant or PHICH timing may refer to a DL subframe configured so as to transmit/receive a PHICH for a UL grant for scheduling UL data of a specific UL subframe or the corresponding UL data transmission, or a timing relationship therebetween. Specifically, apply a UL grant or PHICH timing configured for a specific CC (i.e., Ref-CC) or a specific Ref-cfg may mean using the UL-configuration (UD-Cfg) of a specific CC or a parameter value corresponding to a specific UD-cfg.

When the PDCCH/PDSCH-to-ACK/NACK timing (for example, 4 ms) of the legacy FDD cell is directly applied to the PDSCH of the FDD cell in the TDD PCell-FDD SCell CA, ACK/NACK may not be transmitted if the TDD PCell is defined as DL SF at the ACK/NACK transmission timing. Therefore, a new DL HARQ timing other than the PDCCH/PDSCH-to-ACK/NACK timing defined in the legacy FDD cell may be applied. Likewise, a new HARQ timing may be applied as the UL HARQ timing. For example, there may be the following DL HARQ timings:
1) DL HARQ timing for the TDD Scell in case of the FDD Pcell (PDSCH to HARQ-ACK timing):
  A. Self-scheduling: the DL HARQ timing of the FDD Pcell is applied.
  B. Cross-carrier scheduling: the DL HARQ timing of the FDD Pcell is applied.
2) DL HARQ timing for the FDD Scell in case of the TDD Pcell (PDSCH to HARQ-ACK timing):
  A. Self-Scheduling
    i. Option 1: For each TDD Pcell U/D configuration, new additional timings for DL subframes for which DL HARQ timing is not defined at the TDD Pcell timing+TDD Pcell timing (or new timings for each TDD Pcell U/D configuration for addressing more DL subframes than defined in the TDD Pcell) are applied.
    ii. Option 2: A reference U/D configuration defined (or configured) for the FDD Scell is applied. The (configurable) reference U/D configuration depends on the UD configuration of the TDD Pcell (The new timing may be added to the reference U/D configuration for supporting more DL subframes).
  B. Cross-carrier scheduling: The same options as those (Option 1 and Option 2) of the self-scheduling case or only TDD Pcell timing is applied.

In the next system after LTE, a method of operating by re-configuring/changing the UL/DL SF direction for the purpose of enhanced interference mitigation and traffic adaptation (eIMTA) in TDD situations is considered. To this end, the basic UL-DL configuration (UD-cfg) of the TDD cell (or CC) may be (semi-)statically configured using higher layer signaling (e.g., SIB), and then the operation UD-cfg of the cell (or CC) may be dynamically reconfigured/changed using lower layer signaling (e.g., L1 (Layer 1) signaling (e.g., PDCCH)). For simplicity, the basic UD-cfg is referred to as SIB-cfg, and the operation UD-cfg is referred to as actual-cfg. The subframe configuration according to the UD-cfg is established based on Table 1. When a DL SF, a UL SF, and a special SF are defined as D, U, and S, respectively, reconfiguration of D to U (or S) It may not be easy or may cause deterioration, considering the legacy DL reception/measurement using CRS in the D. On the other hand, in the case of reconfiguration of a U (or S) to D, the base station may provide additional DL resources to the eIMTA UE by not intentionally scheduling/configuring a UL signal that may be transmitted from the legacy UE through the U.

In view of the above, the actual-cfg may be selectively determined only among UD-cfg (including SIB-cfg) including all Ds in the SIB-cfg. That is, a UD-cfg in which D is placed at the D positions in SIB-cfg may be determined as an actual-cfg, but a UD-cfg in which U is placed at a D position in SIB-cfg may not be determined as an actual-cfg. Meanwhile, in eIMTA, a reference UD-cfg (hereinafter, D-ref-cfg) may be separately configured by a higher layer (signaling) in order to configure an HARQ timing (for example, HARQ-ACK feedback transmission timing) for DL scheduling. Considering this, the actual-cfg may be selectively determined only among the UD-cfgs (including the D-ref-cfg) which include all Us in D-ref-cfg. Therefore, the UD-cfg in which D is placed at the U position in the D-ref-cfg may not be determined as an actual-cfg.

Therefore, the D-ref-cfg may be configured by a UD-cfg which includes all Ds on possible actual-cfg candidates, and the SIB-cfg may be configured as a UD-cfg which includes all Us on possible actual-cfg candidates. That is, D-ref-cfg may be configured as a D superset UD-cfg for possible actual-cfg candidates, and the SIB-cfg may be configured for a U superset UD-cfg for possible actual-cfg candidates. The reference UD-cfg (hereinafter, U-ref-cfg) of the HARQ timing (e.g., UG/PUSCH/PHICH transmission timing) for UL scheduling may be configured as an SIB-cfg. Thus, the U in D-ref-cfg is considered as a fixed U, and the D in the SIB-cfg may be considered as a fixed D. Accordingly, only SFs that are D in the D-ref-cfg and U in the SIB-cfg may be considered as flexible U that may be reconfigured/changed from U to D. The flexible U may be reconfigured/changed from U to D by the actual-cfg.

That is, one of the UD-cfg(s) including all D's in the SIB-cfg and all U's in the D-ref-cfg after the SIB-cfg/D-ref-cfg is configured by a higher layer (signaling) may be configured for an actual-cfg by L1 signaling.

Similarly, in the FDD system, the eIMTA may be applied (hereinafter, FDD eIMTA) by reconfiguring some UL SFs on a UL carrier as DL SFs (and/or special SFs). For example, operation may be performed by reconfiguring/changing a UL SF on an UL carrier according to the TDD UL-DL configuration.

In a subframe, a plurality of UCIs, a plurality of PUCCHs, or a plurality of PUSCHs may collide. Priorities are given to the uplink signal transmissions due to a constraint on the UCI payload that may be transmitted on a single uplink channel, disallowance of simultaneous transmission of a plurality of PUCCHs through a Pcell by a UE, and the like.

Only the high priority signal(s) is transmitted in the corresponding subframe and the lower priority signal(s) is dropped in the corresponding subframe.

The following table illustrates a payload (bits per bandwidth part (BP) (bits/BP)) according to CSI information, mode state, and PUCCH reporting mode according to PUCCH report type.

TABLE 8

| PUCCH Reporting Type | Reported | Mode State | PUCCH Reporting Modes | | | |
|---|---|---|---|---|---|---|
| | | | Mode 1-1 | Mode 2-1 | Mode 1-0 | Mode 2-0 |
| 1 | Sub-band CQI | RI = 1 | NA | 4 + L | NA | 4 + L |
| | | RI > 1 | NA | 7 + L | NA | 4 + L |
| 1a | Sub-band CQI/ second PMI | 8 antenna ports RI = 1 | NA | 8 + L | NA | NA |
| | | 8 antenna ports 1 < RI < 5 | NA | 9 + L | NA | NA |
| | | 8 antenna ports RI > 4 | NA | 7 + L | NA | NA |
| | | 4 antenna ports RI = 1 | NA | 8 + L | NA | NA |
| | | 4 antenna ports 1 < RI ≤ 4 | NA | 9 + L | NA | NA |
| 2 | Wideband CQI/PMI | 2 antenna ports RI = 1 | 6 | 6 | NA | NA |
| | | 4 antenna ports RI = 1 | 8 | 8 | NA | NA |
| | | 2 antenna ports RI > 1 | 8 | 8 | NA | NA |
| | | 4 antenna ports RI > 1 | 11 | 11 | NA | NA |
| 2a | Wideband first PMI | 8 antenna ports RI < 3 | NA | 4 | NA | NA |
| | | 8 antenna ports 2 < RI < 8 | NA | 2 | NA | NA |
| | | 8 antenna ports RI = 8 | NA | 0 | NA | NA |
| | | 4 antenna ports 1 ≤ RI ≤ 2 | NA | 4 | NA | NA |
| | | 4 antenna ports 2 ≤ RI ≤ 4 | NA | NA | NA | NA |
| 2b | Wideband CQI/ second PMI | 8 antenna ports RI = 1 | 8 | 8 | NA | NA |
| | | 8 antenna ports 1 < RI < 4 | 11 | 11 | NA | NA |
| | | 8 antenna ports RI = 4 | 10 | 10 | NA | NA |
| | | 8 antenna ports RI > 4 | 7 | 7 | NA | NA |
| | | 4 antenna ports RI = 1 | 8 | 8 | NA | NA |
| | | 4 antenna port 1 < RI ≤ 4 | 11 | 11 | NA | NA |
| 2c | Wideband CQI/ first PMI/ second PMI | 8 antenna ports RI = 1 | 8 | NA | NA | NA |
| | | 8 antenna ports 1 < RI ≤ 4 | 11 | NA | NA | NA |
| | | 8 antenna ports 4 < RI ≤ 7 | 9 | NA | NA | NA |
| | | 8 antenna ports RI = 8 | 7 | NA | NA | NA |
| | | 4 antenna ports RI = 1 | 8 | NA | NA | NA |
| | | 4 antenna port 1 < RI ≤ 4 | 11 | NA | NA | NA |
| 3 | RI | 2/4 antenna ports, 2-layer spatial multiplexing | 1 | 1 | 1 | 1 |
| | | 8 antenna ports, 2-layer spatial multiplexing | 1 | NA | NA | NA |
| | | 4 antenna ports, 4-layer spatial multiplexing | 2 | 2 | 2 | 2 |
| | | 8 antenna ports, 4-layer spatial multiplexing | 2 | NA | NA | NA |
| | | 8-layer spatial multiplexing | 3 | NA | NA | NA |
| 4 | Wideband CQI | RI = 1 or RI > 1 | NA | NA | 4 | 4 |
| 5 | RI/first PMI | 8 antenna ports, 2-layer spatial multiplexing | 4 | NA | NA | NA |
| | | 8 antenna ports, 4 and 8-layer spatial multiplexing | 5 | | | |
| | | 4 antenna ports, 2-layer spatial multiplexing | 4 | | | |
| | | 4 antenna ports, 4-layer spatial multiplexing | 5 | | | |
| 6 | RI/PTI | 8 antenna ports, 2-layer spatial multiplexing | NA | 2 | NA | NA |
| | | 8 antenna ports, 4-layer spatial multiplexing | NA | 3 | NA | NA |
| | | 8 antenna ports, 8-layer spatial multiplexing | NA | 4 | NA | NA |
| | | 4 antenna ports, 2-layer spatial multiplexing | NA | 2 | NA | NA |
| | | 4 antenna ports, 4-layer spatial multiplexing | NA | 3 | NA | NA |

Referring to the table above, when the CSI report of the PUCCH reporting type 3, 5 or 6 of a serving cell conflicts with the PUCCH reporting type 1, 1a, 2, 2a, 2b, 2c or 4 of the same serving cell, namely, when the corresponding reporting timing is the same subframe, the CSI report of the latter PUCCH reporting type has a low priority and is dropped at the corresponding reporting timing. For a UE set to transmission mode 10, if there is a conflict between CSI reports of the same serving cell with the same priority PUCCH reporting type and the CSI reports correspond to different CSI processes, all CSI reports corresponding to CSI processes are dropped except a CSI process with the lowest CSI process ID. When there is a conflict between CSI reports of the same serving cell having PUCCH reporting types of the same priority for a UE set to transmission mode 1-9 and configured with CSI subframe set $C_{CSI,0}$ and CSI subframe set $C_{CSI,1}$ by a higher layer signal for the serving cell the CSI report corresponding to the CSI subframe set $C_{CSI,1}$ is dropped. For a UE set to transmission mode 10 and configured with CSI subframe set $C_{CSI,0}$ and CSI subframe set $C_{CSI,1}$ by a higher layer signal for the serving cell, when there is a conflict between CSI reports of the same serving cell having PUCCH reporting types of the same priority and the CSI reports correspond to CSI processes having the same CSI-process ID, the CSI report corresponding to the CSI subframe set $C_{CSI,1}$ is dropped. If the UE is configured with more than one serving cell, the UE transmits a CSI report on only one serving cell in a given subframe. For the given subframe, when a CSI report of PUCCH reporting type 3, 5, 6 or 2a of a serving cell conflicts with a CSI report of PUCCH reporting type 1, 1a, 2, 2b, 2c or 4 of another serving cell, the latter CSI has a low priority and is dropped at the subframe (i.e., the corresponding transmission timing). For a given subframe, if the CSI report of a PUCCH reporting type 2, 2b, 2c or 4 of a serving cell conflicts with a CSI report of a PUCCH reporting type 1 or 1a of another serving cell, the latter CSI report may have the lower priority and is dropped in the subframe (i.e., at the corresponding transmission timing). For serving cells in which the UE is set to transmission mode 1-9 in the given subframe, if there is a conflict between CSI reports of different serving cells with PUCCH reporting types having the same priority, all the CSI reports on the serving cells are dropped except the CSI report on a serving cell having the lowest serving cell index. For the serving cells in which the UE is set to transmission mode 10 in the given subframe, if there is a conflict between CSI reports of different serving cells with PUCCH reporting types having the same priority and the CSI reports correspond to CSI processes having the same CSI-process ID, all the CSI reports on the serving cells are dropped except the CSI report on a serving cell having the lowest serving cell index. For the serving cells in which the UE is set to transmission mode 10 in the given subframe, when there is a conflict between CSI reports of different serving cells with PUCCH reporting types having the same priority and the CSI reports correspond to CSI processes having different CSI-process IDs, all the CSI reports on the serving cells are dropped except the CSI report on a serving cell having CSI reports corresponding to a CSI process having the lowest CSI-process ID. In the given subframe, if the CSI report of a serving cell in which the UE is set to transmission mode 1-9 conflicts with the CSI report(s) corresponding to the CSI process(es) of other serving(s) in which the UE is set to transmission mode 10, and the CSI reports of the serving cells are of PUCCH reporting types of the same priority, the CSI report(s) corresponding to the CSI process(es) with the CSI process ID of the other serving cell(s)>1 are dropped. In the given subframe, if the CSI report of a serving cell in which the UE is set to transmission mode 1-9 conflicts with a CSI report corresponding to the CSI process ID=1 of another serving cell in which the UE is set to transmission mode 10, and the CSI reports of the serving cells are of PUCCH reporting types of the same priority, the CSI report of the serving cell with the highest serving cell index is dropped.

If the UE is not configured for simultaneous PUSCH and PUCCH transmission, or if the UE is configured for simultaneous PUSCH and PUCCH transmission but it is not the timing for PUSCH transmission, CSI is dropped when the CSI conflicts with a positive SR in the same subframe.

In the case where a periodic CSI report and HARQ-ACK conflicts with each other for a UE in the same subframe without a PUSCH, the periodic CSI report is dropped if the periodic CSI report and the HARQ-ACK cannot be transmitted on a single uplink channel (e.g., if the concurrent ACK/NACK and CQI parameter provided by the UE is set to False). In the case where a periodic CSI report and HARQ-ACK conflicts with each other for a UE configured with a single serving cell and not configured in PUCCH Format 3 in the same subframe without a PUSCH, the concurrent ACK/NACK and CQI parameter provided by the higher layer is set to True, the periodic CSI report is multiplexed with the HARQ-ACK on the PUCCH. Otherwise, the CSI is dropped.

If the UE is not configured for simultaneous PUSCH and PUCCH transmission, the UE transmits a periodic CSI report on the PUCCH in a subframe without PUSCH allocation and transmits the periodic CSI report on the PUSCH of a serving cell having the lowest serving cell index in a subframe with PUSCH allocation. When a periodic CSI report and an aperiodic CSI report are generated in the same subframe, the UE transmits only the aperiodic CSI report in the subframe.

When an SR conflicts with ACK/NACK, the SR and ACK/NACK may be multiplexed and transmitted together.

As more communication devices demand larger communication capacity, efficient use of a limited frequency band in a future wireless communication system becomes increasingly important. Even in a cellular communication system such as a 3GPP LTE/LTE-A system, a method of using, for traffic offloading, an unlicensed band such as a band of 2.4 GHz used by a legacy Wi-Fi system or an unlicensed band such as a band of 5 GHz, which is newly in the spotlight, is under consideration.

Basically, since the unlicensed band is based on wireless transmission/reception through contention between communication nodes, it is necessary for each communication node to confirm that other communication nodes do not perform signal transmission by performing channel sensing before signal transmission. This procedure is called clear channel assessment (CCA). Even an eNB or a UE of the LTE system needs to perform CCA for signal transmission in the unlicensed band (hereinafter, referred to as an LTE-U band). While the eNB or the UE of the LTE system transmits a signal, other communication nodes such as a Wi-Fi node should not create interference by performing CCA. For example, in Wi-Fi standards (e.g. 801.11ac), a CCA threshold is specified as −62 dBm with respect to a non-Wi-Fi signal and as −82 dBm with respect to a Wi-Fi signal, which means that an STA or an AP does not perform signal transmission so as not to create interference when a signal other than the Wi-Fi signal is received at a power of −62 dBm or more. Characteristically, in a Wi-Fi system, the STA or the AP may perform CCA and perform signal transmission, unless signals greater than the CCA threshold are detected for 4 μs or more.

An eNB may transmit a signal to a UE or the UE may transmit a signal to the eNB in the carrier aggregation situation of the LTE-A band and the LTE-U band. In the following description, it is assumed for convenience of description of proposed schemes that the UE is configured to perform wireless communication through two component carriers (CCs) in the LTE-A band and the LTE-U band. As an example, a CC of the LTE-A band may be configured as a PCC and a CC of the LTE-U band may be configured as an SCC. However, the embodiments of the present invention may be extensively applied to a situation in which a plurality of LTE-A bands and a plurality of LTE-U bands are used by a carrier aggregation scheme or may be applied even when signal transmission/reception between the eNB and the UE is performed only in the LTE-U band. In addition, the embodiments of the present invention may be extensively applied not only to the 3GPP LTE/LTE-A system but also to systems having other characteristics.

Hereinafter, for convenience of description, a cell that is configured in a licensed band for 3GPP LTE/LTE-A and operates by a 3GPP LTE/LTE-A scheme will be referred to as an Lcell and a cell that is configured in an unlicensed band operating by an LTE-U scheme and operates by the LTE-U scheme will be referred to as a Ucell.

In order for an eNB and a UE to perform communication in the LTE-U band which is an unlicensed spectrum, the eNB and the UE should occupy/secure the corresponding band for a specific time duration through contention with other communication (e.g. Wi-Fi) systems which are not associated with the LTE/LTE-A system. Hereinafter, the time duration occupied/secured for communication in the LTE-U band will be referred to as a reserved resource period (RRP), for convenience. To secure the RRP, various methods may be used. Typically, there may be a method of transmitting a specific reservation signal so that other communication system devices such as a Wi-Fi device may recognize that a corresponding radio channel is busy, or continuously transmitting an RS and a data signal so that a signal of a specific power level or more may be seamlessly transmitted during the RRP.

The RRP may be configured based on carrier sensing performed by the eNB. If the eNB has determined the RRP during which the eNB desires to occupy the LTE-U band in advance, the eNB may pre-inform the UE of the RRP so that the UE may maintain a communication transmission/reception link during the indicated RRP. As a scheme of informing the UE of information about the RRP, the eNB may transmit the information about the RRP through another CC (e.g. the LTE-A band) connected in the form of carrier aggregation.

An entity for determining the RRP may differ according to whether transmission is performed on DL or UL. For example, the RRP for DL transmission (hereinafter, a DL RRP) may be determined by the eNB based on carrier sensing performed by the eNB. The RRP for UL transmission (a UL RRP) may be determined by the eNB based on carrier sensing performed by the eNB and then indicated to the UE. Alternatively, the UE may confirm or determine the UL RRP in units of subframes by confirming a channel state, i.e. through carrier sensing performed by the UE, prior to signal transmission.

On a cell used for legacy carrier aggregation, i.e. on an Lcell, an RS for channel synchronization or an RS for channel measurement, such as a PSS/SSS/PBCH, a CRS, and/or a CSI-RS, appears periodically and continuously. In contrast, on a Ucell, the eNB may configure the RRP only when the Ucell is in an idle state and transmit the RS for channel measurement in the RRP. Therefore, the synchronization/measurement RSs will appear aperiodically and/or discontinuously on the Ucell.

Meanwhile, on the Lcell, although the UE is configured to detect the RS(s) or perform synchronization or measurement using the RS(s) for a time duration while the Lcell is activated, the RS(s) may be transmitted for a time duration while the Lcell is inactivated. The synchronization/measurement RS(s) are continuously transmitted regardless of activation or inactivation of the Lcell but the UE is configured to detect the synchronization/measurement RSs only for a time duration during which the Lcell is activated. Unlike this, on the Ucell, the eNB transmits the synchronization or measurement RS(s) only during the RRP and, in principle, does not transmit synchronization or measurement RS(s) during a non-RRP because a wireless communication medium is occupied by other devices during the non-RRP.

As another example of an operation in the LTE-U band which operates by a contention-based random access scheme, the eNB may first perform carrier sensing (CS) before transmitting/receiving data. The eNB may check whether a current channel state of an SCell is busy or idle. If it is determined that the current channel state is idle, the eNB may transmit a scheduling grant through a PDCCH of a PCell (i.e. through cross carrier scheduling (CCS)) or through a PDCCH of the SCell and attempt to transmit/receive data. In this case, for example, the eNB may configure an RRP including M consecutive subframes (SFs). Here, the eNB may pre-inform the UE of the M value and usage of the M SFs through higher layer signaling (using the PCell) or through a physical control/data channel. A start timing of the RRP may be periodically or semi-statically configured through higher layer signaling. If the start timing of the RRP should be set to SF #n, the start timing of the RRP may be designated through physical layer signaling in SF #n or SF #(n−k).

FIG. 10 illustrates a subframe configuration of an RRP.

The RRP may be configured such that boundaries of subframe(s) constituting the RRP are aligned with boundaries of subframe(s) configured on a Pcell, as illustrated in FIG. 10(a), or such that the boundaries of the subframe(s) constituting the RRP are misaligned with the boundaries of the subframe(s) configured on the Pcell, as illustrated in FIG. 10(b).

As described above, in an LTE-U system that operates on a contention basis through carrier sensing in an unlicensed band, an available (e.g. usable for data transmission/scheduling) resource duration may be aperiodically secured/configured according to a carrier sensing result. When a cell/carrier operating according to the above LTE-U scheme is referred to as a Ucell, for convenience, and a resource duration aperiodically configured on the Ucell is defined as an RRP, if the RRP is secured on the Ucell, a situation may be considered in which an eNB opportunistically schedules data transmission to a UE for which the Ucell is configured only during the RRP.

When a plurality of cells is configured for the UE, the LTE-A system commonly applies a timing advance (TA) value applicable to one specific cell (e.g., PCC or Pcell) to the plurality of cells. However, a Ucell and a non-Ucell belonging to different frequency bands (i.e., largely spaced from each other in the frequency domain) may be carrier aggregated, or the carrier aggregated Ucell and non-Ucell may have different propagation characteristics. Further, in the case of a particular cell, devices such as RRH may be disposed in the cell to expand the coverage or remove coverage holes. In this case, UL transmission using a scheme of commonly applying one TA value to a plurality of cells subjected to carrier aggregation may seriously affect synchronization of the UL signal transmitted on the plurality of cells.

The UE may be configured with two cells (e.g., PCell and SCell), and a UL signal may be transmitted by applying different TAs to the cells. For example, TA 1 may be applied to UL transmission of the PCell, and TA 2 may be applied to UL transmission of the SCell. The transmission end time of the UL subframe/signal (e.g., PUSCH, PUCCH, SRS, etc.) may be advanced by TA with respect to the reception end time of the DL subframe. Equivalently, the transmission start time of the UL subframe/signal (e.g., PUSCH, PUCCH, SRS, etc.) may be advanced by TA with respect to the reception start time of the DL subframe.

Thus, it may be considered to allocate TA independently for each cell group/unit. Hereinafter, a group of cells which are configured by a higher layer (e.g., RRC) and use the same timing reference cell and the same TA value for UL-configured cells, will be referred to as a TA group (TAG). The TAG may include one or more cells (CCs). One TA may be commonly applied to the cell(s) in a TAG. The TAG may be divided into a primary TAG (PTAG) including a Pcell and a secondary TAG (STAG) including at least one serving cell having configured UL without including a Pcell. In the case of the PTAG including the Pcell, a TA that is determined based on the Pcell or adjusted through a random access procedure that accompanies the Pcell may be applied to all the cell(s) in the PTAG. On the other hand, in the case of the STAG that does not include a Pcell, i.e., that consists of only Scell(s), a TA determined based on a specific Scell in the STAG may be applied to all Scell(s) in the STAG. To this end, the random access procedure may be performed not only through the Pcell but also through the Scell. The random access procedure accompanying an Scell may not be a contention based random access procedure triggered by the UE but may be a non-contention based random access procedure which the eNB triggers using a PDCCH (i.e., PDCCH order) for commanding RACH preamble transmission.

The LTE/LTE-A systems up to now may support CA of up to five cells/carriers/CCs (hereinafter, referred to as cell) for one UE. Except for the case of dual connectivity (DC), a PUCCH carrying UCI (e.g., HARQ-ACK, CSI, etc.) associated with the plurality of cells may be transmitted through the Pcell alone. When a master cell group (MCG) or a secondary cell group (SCG) is configured, the UE in the RRC_connected state is configured with DC. Each serving cell of the UE exclusively belongs to the MCG or SCG. If the UE is configured with DC, this substantially means that the UE is connected to two eNBs at the same time. In this case, the MCG may consist of cell(s) managed by an eNB (hereinafter, eNB M) that the UE accesses first between the two eNBs, and the SCG may consist of cell(s) managed by an eNB (hereinafter, eNB S) that the UE is additionally connected after the UE is connected to the eNB M. since the UE configured with DC is connected to two eNBs, i.e., two schedulers, DL/UL scheduling, UCI transmission, and the like for the MCG are performed only for the cells of the MCG, and DL/UL scheduling, UL scheduling, and the like for the SCG are performed only for the cells of the SCG. Therefore, in the case of cross-carrier scheduling, if the scheduling cell belongs to the MCG, the scheduled cell of the scheduling cell also belongs to the MCG. If the scheduling cell belongs to the SCG, the scheduled cell of the scheduling cell also belongs to the SCG, and cross-scheduling between the cell of the MCG and the cell of the SCG is not performed. In other words, the scheduling cell and the corresponding scheduled cell do not belong to different CGs. In addition, the UE configured with the DC has two Pcells for two eNB, respectively, the UCI for the MCG may be transmitted through the PUCCH on the Pcell of the MCG, the UCI for the SCG is transmitted through the PUCCH on the Pcell of the SCG. The UCI for the MCG is not allowed to be transmitted from the SCG, and the UCI for the SCG is not allowed to be transmitted from the MCG.

In the future system, it may be considered to support CA for 5 or more cells for one UE for the purpose of a higher data rate. In this case, in order to reduce the PUCCH resource burden on the Pcell according to increase of UCI transmission frequency/size (due to increase in the number of cells constituting CA), enabling transmission of a PUCCH (and transmission of UCI therethrough) through a specific Scell (hereinafter, Acell) (in addition to the Pcell) may be considered. While the Pcell of the MCG and the Pcell of the SCG are controlled by independent schedulers, the Pcell and Acell according to the present invention are controlled by a single scheduler.

The present invention proposes a structure and method for UCI transmission through an appropriate PUCCH/PUSCH in a case where PUCCH transmission through an Acell is allowed in a CA situation. Basically, if HARQ-ACK PUCCH transmission through an Acell is allowed when the entire CA is configured with two cells groups (CGs), CG1 and CG2, HARQ-ACK for CG1 (DL data reception through it), the PUCCH carrying HARQ-ACK for CG1 (DL data reception therethrough) may be transmitted through a Pcell, and the PUCCH carrying HARQ-ACK for CG2 may be transmitted through the Acell. Here, the Pcell may be included in CG1 and the Acell may be included in CG2. For simplicity, embodiments of the present invention will be described on the assumption that the Pcell belongs to CG1 and the Acell belongs to CG2. However, embodiments of the present invention may also be applied when the Pcell belongs to CG2 and the Acell belongs to CG1. Further, while it is assumed that one Acell and two CGs are configured, the proposed principle and operation of the present invention may be similarly applied even in a case where two or more Acells and three or more CGs are configured.

The dynamic PUCCH resource on the Acell may be determined based on the lowest CCE index of the DL grant PDCCH or the SPS release PDCCH transmitted on the Acell or the lowest CCE index of the EPDCCH. The explicit PUCCH resources or explicit PUCCH resource candidates on the Acell may be configured by a higher layer signal. A PUCCH resource that is actually used among the PUCCH resource candidates may be indicated by the ARI.

Methods for Selecting a UCI Transmission Cell in a Situation where PUCCH Transmission is Configured in the Scell When PUCCH transmission is configured in the Acell in the CA situation, a UCI transmission cell may be selected using the following methods in consideration of more flexible and efficient UCI transmission.

FIGS. 11 to 14 illustrate UCI transmission according to embodiments of the present invention.

Case 1) No UL Channel Transmission or only PUSCH Transmission Performed in One CG When there is no UL channel transmission (e.g., PUCCH or PUSCH) or only PUSCH transmission performed in the entirety of a specific CG (and transmission of multiple UCIs is required in the other CG at the same time), simultaneous transmission of a plurality of PUCCHs through the other CG (e.g., a PUCCH transmission cell belonging to the corresponding CG) may be allowed. Hereinafter, simultaneous transmission means that corresponding signals are transmitted in a single subframe.

For example, referring to FIG. 11(a), if there is no PUCCH or PUSCH transmission (i.e., there is neither PUCCH nor PUSCH) in the entirety of CG2 or there is PUSCH transmission in a situation where A/N transmission and CSI transmission are simultaneously required through CG1 (or for CG1) (when simultaneous transmission of ACK/NACK (hereinafter, A/N) and CSI over the PUCCH is not configured), both the PUCCH carrying A/N (for CG1) and the PUCCH carrying CSI (for CG1) may be simultaneously transmitted through CG1 (e.g., Pcell). As another example, referring to FIG. 11(b), if there is PUCCH and PUSCH transmission or there is PUCCH transmission in CG2 in a situation where A/N transmission and CSI transmission are simultaneously required through CG1 (or for CG1) (when simultaneous transmission of ACK/NACK (hereinafter, A/N) and CSI over the PUCCH is not configured), transmission of CSI (for CG1) may be omitted/abandoned (i.e., dropped) and only one PUCCH carrying the A/N (for CG1) may be transmitted through CG1 (e.g., Pcell).

Even when SR transmission and CSI transmission are simultaneously required through the CG1, an operation similar to those of the above examples may be applied. For example, in the above examples, the A/N may be replaced with SR.

Case 2) Multiple UCIs in One CG with a Higher Priority than the UCI in the Other CG If a plurality of UCIs (for example, A/N, CSI, and/or SR) required to be transmitted through a specific CG have a higher priority than a UCI which is required to be transmitted through the other CG, simultaneous transmission of a plurality of PUCCHs through a specific CG (for example, a PUCCH transmission cell belonging to the specific CG) may be allowed.

Figure 12:
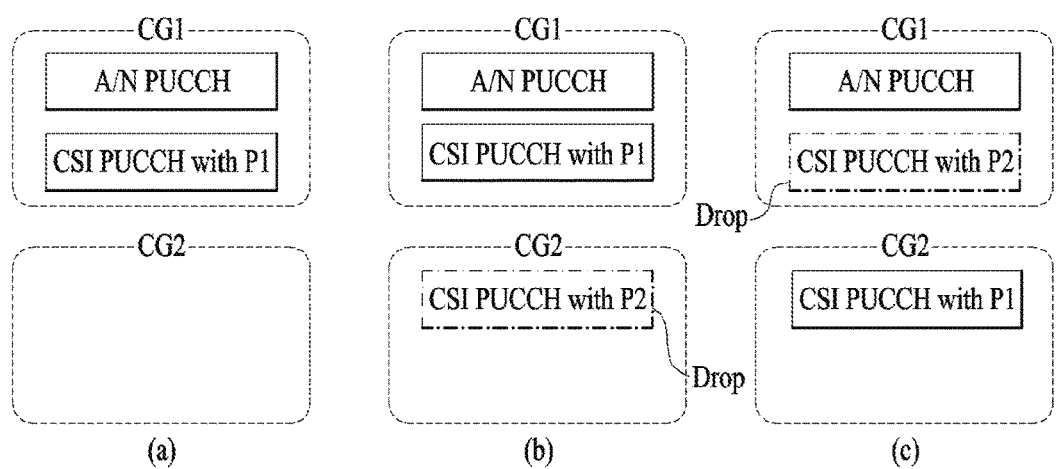

For example, in a situation where A/N transmission and CSI (i.e., CG1-CSI) transmission are simultaneously required through CG1 (or for CG1) transmission (without simultaneous transmission of A/N and CSI over the PUCCH configured), A/N transmission and transmission of CSI (i.e., CG2-CSI) are simultaneously required through CG2 (or for CG2), if CG1-CSI has a higher priority than CG2-CSI, transmission of CG2-CSI may be dropped, and both the PUCCH carrying A/N (for CG1) and the PUCCH carrying CG1-CSI may be transmitted simultaneously through CG1 (e.g., Pcell). Referring to FIGS. 12(a) and 12(b), when there is an A/N PUCCH and a CSI PUCCH whose transmission is configured on CG1 in a subframe, and there is no PUCCH and there is no PUCCH (with a higher priority) whose transmission is configured on CG2 in the same subframe, the A/N PUCCH and the CSI PUCCH are simultaneously transmitted on CG1 in the subframe, unlike in the legacy system. In FIGS. 12, P1 and P2 denote priorities, and it is assumed that the CSI of P1 has a higher priority than the CSI of P2.

In another example, in a situation where A/N transmission and CSI (i.e., CG1-CSI) transmission through CG1 (or CG1), and transmission of CSI (i.e., CG2-CSI) through CG2 (or for CG2) are simultaneously required (with no simultaneous transmission of A/N and CSI through the PUCCH configured), if CG1-CSI has a lower priority than CG2-CSI, transmission of CG1-CSI may be dropped, the PUCCH carrying A/N may be transmitted through CG1 (e.g., Pcell) and the PUCCH carrying CG2-CSI may be transmitted through CG2 (e.g., Acell). Referring to FIG. 12(c), when an A/N PUCCH and a CSI PUCCH having priority P2 are configured to be transmitted on CG1 in a subframe and a CSI PUCCH having priority P1 is configured to be transmitted on CG2 in the same subframe, the transmission of A/N PUCCH on the CG1 and transmission of the CSI having priority P1 on the PUCCH of the CG2 are simultaneously performed in the subframe. The CSI having priority P2 is dropped in the same subframe.

Even when SR transmission and CSI transmission through the CG1 are simultaneously required, an operation similar to those of the above examples may be applied. For example, in the above examples, the A/N may be replaced with SR.

Case 3) Collision of Multiple UCIs in One CG

Figure 13:
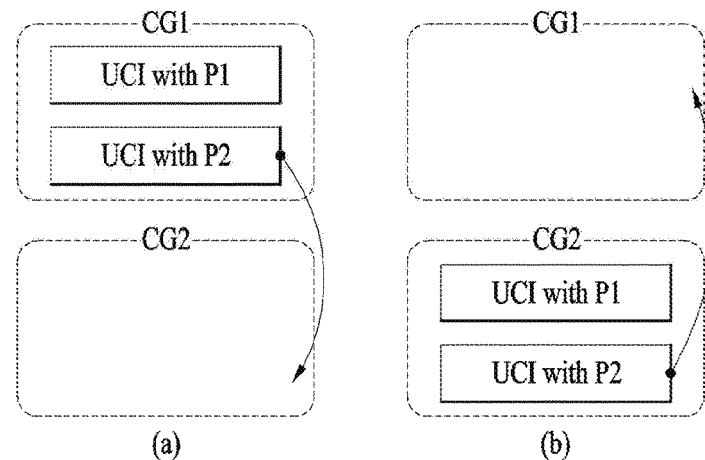

If simultaneous transmission of a plurality of UCIs through a specific CG is required (and there is no PUCCH or PUSCH transmission (that is, there is neither PUCCH nor PUSCH) or there is only PUSCH transmission for the entirety of the other CG), a specific portion of the plurality of UCIs (e.g., UCIs with a lower priority) may be transmitted through the other CG. In FIGS. 13, P1 and P2 denote priorities and it is assumed that and P1 is higher than P2. Referring to FIG. 13, when a UCI having priority P1 and a UCI having priority P2, which are configured to be transmitted in one CG, occur in the same subframe, the UCI having priority P2 is transmitted on the other CG if the UCIs cannot be transmitted over a single PUCCH or PUSCH.

For example, in a situation where A/N transmission and CSI transmission through CG1 (or for CG1) are simultaneously required (while simultaneous transmission of A/N and CSI over the PUCCH is not configured), if there is neither PUCCH transmission nor PUSCH transmission (namely, there is neither PUCCH nor PUSCH) in the entirety of CG2, or there is only PUSCH transmission, the A/N (for CG1) may be transmitted over the on the PUCCH on CG1 (e.g., Pcell), and the CSI (for CG1) may be transmitted over the PUCCH or PUSCH on CG2 (e.g., Acell). The PUCCH resource on the CG2 used at this time, for example, the corresponding CSI PUCCH resource on the CG2, may be preconfigured by a higher layer signal (e.g., an RRC signal). The PUSCH resource on the CG2 used at this time may be allocated through the UL grant transmitted on a specific cell according to the self-CC scheduling configuration or the cross-CC scheduling configuration.

As another example, in a situation where aperiodic CSI (hereinafter, a-CSI) transmission and periodic CSI (hereinafter, p-CSI) transmission through CG1 (or for CG1) are simultaneously required, if there is neither PUCCH transmission nor PUSCH transmission (namely, there is neither PUCCH nor PUSCH) in the entirety of CG2, or there is only PUSCH transmission, the a-CSI may be transmitted over the PUSCH on CG1 and the p-CSI may be transmitted over the PUCCH or PUSCH on the CG2 (e.g., Acell). If there is a UCI whose transmission in the other CG is required, the UCI having a PUSCH is dropped in each CG according to the priorities in each CG. In this case, even if a UCI having a lower priority in one CG (e.g., CG1) is higher than the UCI having the highest priority in the other CG (e.g., CG2), the UCI of CG1 may be dropped.

Even when SR transmission and CSI transmission through CG1 are simultaneously required, an operation similar to those of the above examples may be applied. For example, in the above examples, the A/N may be replaced with SR.

Case 4) Collision of Multiple UCIs Over CGs

Figure 14:
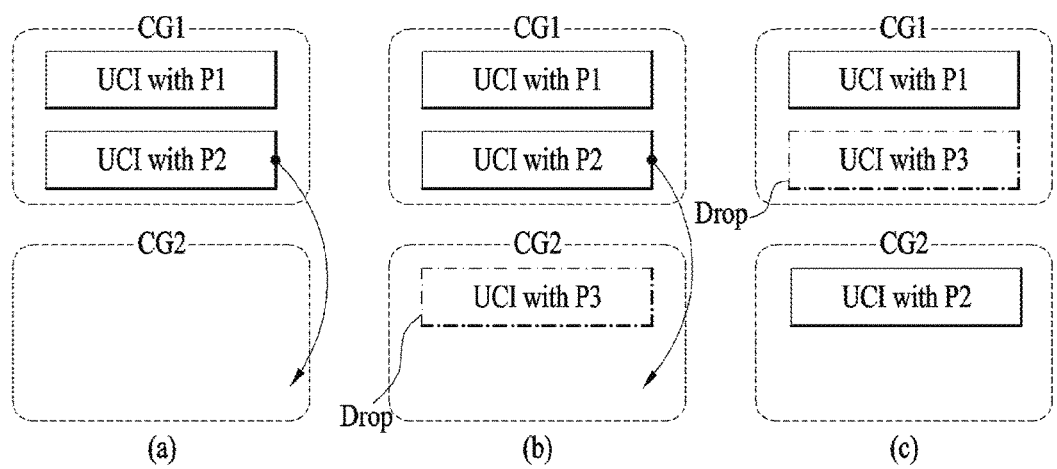

When a plurality of UCIs (hereinafter, UCI-a) required to be transmitted through a specific CG have a higher priority than UCI(s) (hereinafter, UCI-b) required to be transmitted through the other CG, a specific part of the UCI-a (e.g., a UCI having a lower priority) may be transmitted through the other CG. In FIG. 14, it is assumed that priority P1 is higher than priority P2 and priority P2 is higher than priority P3. Referring to FIGS. 14(a) and 14(b), a UCI with priority P1 and a UCI with priority P2 which are configured to be transmitted on CG1 are generated in the same subframe, and the UCIs are not allowed to be transmitted on a single PUCCH or PUSCH, if there is no UCI with a priority higher than P1 and P2 that is to be transmitted on the CG2 in the corresponding subframe, the UCI of the higher priority P1 is transmitted on the CG1 originally set for transmission of the UCI, and the UCI with the lower priority P2 is transmitted over the PUCCH or PUSCH on CG2, in the subframe. Referring to FIG. 14(b), the UCI having a priority lower than P1 and P2 to be transmitted on CG2 in the subframe is dropped. Referring to FIG. 14(c), if a UCI having a higher priority than the UCIs configured to be transmitted in CG1 is present in CG2, transmission of the UCI(s) of CG1 whose priority is lower than the priority of the UCI of CG2 is dropped in the corresponding subframe.

For example, in a situation where A/N transmission and CSI (hereinafter, CG1-CSI) transmission through CG1 (or for CG1) and CSI (hereinafter, CG2-CSI) transmission through CG2 (or for CG2) are simultaneously required (without simultaneous transmission of A/N and CSI through PUCCH configured), if CG1-CSI has a higher priority than CG2-CSI, transmission of CG2-CSI may be dropped, the A/N (for CG1) may be transmitted over the PUCCH on CG1 (e.g., Pcell) and the CG1-CSI may be transmitted over the PUCCH or PUSCH on CG2 (e.g., Acell).

As another example, in a situation where a-CSI transmission and p-CSI (hereinafter, CG1-CSI) transmission through CG1 (or for CG1) and p-CSI (hereinafter, CG2) transmission through CG2 (or for CG2) are simultaneously required, if CG1-CSI has a higher priority than CG2-CSI, transmission of CG2-CSI may be dropped, the a-CSI may be transmitted over the PUSCH on CG1, and CG1-CSI may be transmitted over the PUCCH or PUSCH on CG2 (e.g., Acell). Here, the PUCCH on the CG2 used for transmission of CG1-CSI may be a PUCCH resource configured for transmission (irrespective of the CGs). The PUSCH on the CG2 used for transmission of the CG1-CSI may be allocated on CG2 through the UL grant transmitted on a specific cell according to the self/cross-CC scheduling configuration, irrespective of the UCIs.

Even when SR transmission and CSI transmission through CG1 are simultaneously required, an operation similar to those of the above examples may be applied. For example, in the above examples, the A/N may be replaced with SR.

In the embodiments of Cases 1 to 4 described above, the number of PUCCHs or UCIs simultaneously transmitted in one subframe may depend on the number of cell groups or the number of cells for PUCCH transmission (i.e., Pcell and Acell).

UCI Transmission in a Situation where Configuration of Cross-CG Scheduling between the CGs is Allowed When PUCCH transmission is configured on the Scell (i.e., Acell) in the CA situation, request for the a-CSI from the eNB and reporting of the a-CSI from the UE may be basically performed for each CG. A cell set or a CSI process set which is configured as an a-CSI measurement target (by higher layer (e.g., RRC) signaling) may also be configured for each CG.

When the cross-CC scheduling configuration between CGs is allowed in a CA situation in which Acell PUCCH transmission is configured, a specific (scheduling) cell 1 and a (scheduled) cell 2 to be scheduled from cell 1 may belong to different CGs. For example, cell 1, which is a scheduling cell, may belong to CG1, and cell 2, which is a scheduled cell, may belong to CG2. At this time, if the PUSCH on cell 2 is scheduled through the UL grant DCI transmission on cell 1, and a-CSI transmission is instructed through the DCI, the a-CSI measurement/report target cell(s) or the CSI process(es) corresponding to the a-CSI request may be determined based on cell 2, which is the scheduling cell, and an a-CSI measurement target cell (or CSI process) set configured in CG2 to which cell 2 belongs. For example, triggerXX (where XX is 01, 10, or 11) indicating whether a-CSI is triggered by the CSI request field value XX may be constructed/configured only for the cells (or CSI processes) in the corresponding CG. This method may also be applied to a case where the a-CSI request/report and the a-CSI measurement target cell (or CSI process) set construction/ configuration are performed for each cell group without Scell PUCCH transmission configured. That is, cells may be classified into cell groups for a-CSI measurement without configuration of the Acell.

Meanwhile, the legacy CA in which PUCCH transmission is performed through only one Pcell may be considered as a situation where the scheduling cell 1, the scheduled cell 2 configured to be scheduled by cell 1, and the Pcell on which the UCI (e.g., A/N) PUCCH for cell 2 is transmitted belong to the same CG. In this case, the HARQ-ACK transmission timing for DL data reception in cell 2 (or the reference UL/DL configuration for determining the HARQ-ACK transmission timing) may be determined differently depending on whether or not cell 2 is configured to be cross-CC scheduled by another cell. Hereinafter, the timing applied when cell 2 is configured to be scheduled by another cell is referred to as cross-HARQ timing, and the timing applied when the cell 2 is not configured to be scheduled by another cell is referred to as self-HARQ timing.

Unlike the legacy CA in which the PUCCH transmission is performed through only one Pcell, when cross-CC scheduling is allowed between the CGs in a CA situation in which Acell PUCCH transmission is configured, scheduling cell 1 and scheduled cell 2 configured to be scheduled therefrom may belong to different CGs, and cell 2 and a cell on which UCI (e.g., A/N) PUCCH for cell 2 is transmitted may belong to the same CG. For example, cell 1, which is a scheduling cell, may belong to CG1, cell 2, which is a scheduled cell, may belong to CG2, and a cell on which the UCI (e.g., A/N) PUCCH for cell 2 is transmitted may belong to CG2 to which cell 2 belongs. In this case, in order to reduce unnecessary DL scheduling restrictions due to inefficient HARQ-ACK timing configuration/application, HARQ-ACK timing may be determined differently depending on:

Alt 1) whether cell 2 is configured to be cross-CC scheduled from the PUCCH transmission cell (i.e., Pcell or Acell) configured in CG2 to which cell 2 belongs, or Alt 2) whether cell 2 is configured to be cross-CC scheduled from any cell belonging to CG2.

For example, if there is cross-CC scheduling configuration (based on Alt 1 or Alt 2) for cell 2, cross-HARQ timing may be applied. If there is no cross-CC scheduling configuration (based on Alt 1 or Alt 2) for cell 2, self-HARQ timing may be applied. For example, in the case of Alt 1, when cell 2 belonging to CG2 is configured to be scheduled from any cell (belonging to CG1 or CG2) other than the PUCCH transmission cell configured in CG 2, self-HARQ timing may be applied. In the case of Alt 2, when cell 2 belonging to CG 2 is configured to be scheduled from any cell belonging to CG 1, self-HARQ timing may be applied. In the case of Alt 1, the same operation may be applied even in the CA situation where there is no Scell PUCCH transmission configuration.

Since the Acell corresponds to one Scell in terms of the whole CA, it may be deactivated as in the case of a typical Scell. In this case, all cells belonging to the CG including the Acell may be simultaneously deactivated. At this time, if cross-CC scheduling configuration between the CGs is allowed, the cell (hereinafter, CG2 scheduled cell) in the other CG (e.g., CG1) configured to be cross-CC scheduled from a cell (hereinafter, CG2 scheduling cell) belonging to the CG (e.g., CG2) including the deactivated Acell may also be deactivated. The CG1 scheduling cell may be activated only when both the Acell and CG2 scheduling are activated.

Figure 15:
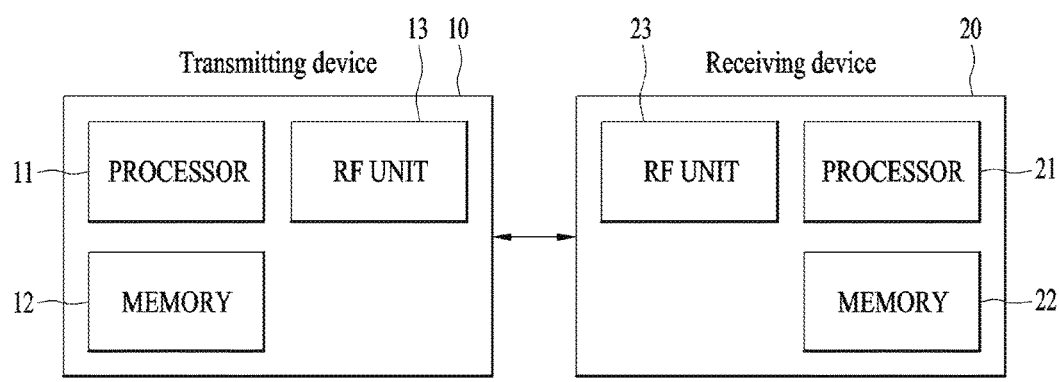
FIG. 15 is a block diagram illustrating elements of a transmitting device 10 and a receiving device 20 for implementing the present invention.

FIG. 15 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

An eNB process according to an embodiment of the present invention may divide the serving cells of a UE into two or more cell groups for the UE. For example, the eNB processor may configure one Pcell group including at least the Pcell and one or more Scell groups each including one or more Scells for the UE. The eNB processor may configure one Scell of each Scell group as the Acell. The eNB processor may control the eNB RF unit to transmit information on a Scell group and information indicating which of the Scell(s) of the Scell group is the Acell. In addition, the eNB processor may configure the PUCCH resource(s) implicitly and/or explicitly for the Pcell and Acell. For example, the eNB processor may configure an SR PUCCH resource, an ACK/NACK PUCCH resource, and a CSI PUCCH resource for each of the Pcell and the Acell, and control the eNB RF unit to transmit information thereon to the UE. The eNB processor may control the eNB RF unit to transmit UCI configuration information on one or more cells or one or more cell groups of the UE to the UE. For example, PDCCH, SR PUCCH configuration, periodic/aperiodic CSI report configuration, and the like associated with the dynamic PUCCH resource may correspond to the UCI configuration information.

The eNB processor of the present invention may receive a plurality of PUCCHs or a plurality of UCIs simultaneously in a subframe according to one of the embodiments of the present invention. Since the eNB processor configured according to one of the embodiments of the present invention knows the PUCCH or UCI to be transmitted by the UE configured according to the corresponding embodiment and the CG for transmission of the PUCCH or UCI and also knows which PUCCH or UCI is to be dropped, the eNB processor may control the eNB RF unit to receive a corresponding uplink signal on the corresponding cell in the corresponding CG. The eNB processor may not expect to receive the PUCCH or UCI dropped by the UE.

The UE processor of the present invention may control the UE RF unit to receive the cell group information, the Acell information for the corresponding cell group, the PUCCH resource information, and/or the UCI configuration information.

The UE processor of the present invention may configure one cell group including the Pcell and no Scell or one or more Scells and at least one cell group including one or more Scells not belonging to the cell group having the Pcell. The UE processor may configure one of the Scell(s) of the cell group consisting of Scell(s) as a PUCCH transmission cell (i.e., Acell). The UE processor may configure cell group(s) and Acell based on the cell group information and the Acell information.

The UE processor may determine whether transmission of a plurality of uplink channels (PUCCHs, PUSCHs, or PUCCH and PUSCH) or a plurality of UCIs is required in a subframe based on the PUCCH resource information, UL grant and/or UCI configuration information, and the like. The UE processor of the present invention may simultaneously transmit a plurality of PUCCHs or a plurality of UCIs in a subframe according to one of the embodiments of the present invention.

In addition, the eNB processor of the present invention may control the eNB RF unit to transmit/receive signals according to HARQ timing according to one of the embodiments of the present invention.

The UE processor of the present invention may control the UE RF unit to transmit/receive signals according to HARQ timing according to one of the embodiments of the present invention.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:
1. A method for transmitting link control information (UCI) by a user equipment (UE), the method comprising:
receiving, through at least one of a plurality of cell groups for the UE, configuration information on a plurality of UCIs configured to be transmitted in subframe n; and
transmitting at least a first UCI with a highest priority and a second UCI with a second highest priority among the plurality of UCIs in the subframe n based on the configuration information,
wherein, when transmission of the first UCI with the highest priority and transmission of the second UCI with the second highest priority are both configured on a first cell group among the plurality of cell groups, the first UCI is transmitted on the first cell group in the subframe n, and the second UCI is transmitted on a second cell group other than the first cell group among the plurality of cell groups in the subframe n.

2. The method according to claim 1, wherein one of the first cell group and the second cell group is a primary cell group having a primary cell, and the second cell group is a secondary cell group having no primary cell but comprising one or more secondary cells not belonging to the primary cell group.

3. The method according to claim 2, further comprising:
receiving information on a special secondary cell for transmission of a physical uplink control channel (PUCCH) among the one or more secondary cells belonging to the secondary cell group.

4. The method according to claim 1, wherein the first UCI and the second UCI are not allowed to be transmitted simultaneously on a single physical uplink channel.

5. The method according to claim 1, further comprising:
dropping transmission of a third UCI when the transmission of the third UCI is configured on the first cell group or the second cell group in the subframe n and the third UCI has a lower priority than the first UCI and the second UCI.

6. A user equipment (UE) for transmitting uplink control information (UCI), the user equipment comprising:
a radio frequency (RF) module including a transceiver; and
a processor configured to control the RF module,
wherein the processor is configured to:
control the RF module to receive, through at least one of a plurality of cell groups for the UE, configuration information on a plurality of UCIs configured to be transmitted in subframe n;
control the RF module to transmit at least a first UCI with a highest priority and a second UCI with a second highest priority among the plurality of UCIs in the subframe n based on the configuration information,
wherein, when transmission of the first UCI with the highest priority and transmission of the second UCI with the second highest priority are both configured on a first cell group among the plurality of cell groups, the first UCI is transmitted on the first cell group in the subframe n, and the second UCI is transmitted on a second cell group other than the first cell group among the plurality of cell groups in the subframe n.

7. The (UE) according to claim 6, wherein one of the first cell group and the second cell group is a primary cell group having a primary cell, and the second cell group is a secondary cell group having no primary cell but comprising one or more secondary cells not belonging to the primary cell group.

8. The (UE) according to claim 7, wherein the processor is further configured to receive information on a special secondary cell for transmission of a physical uplink control channel (PUCCH) among the one or more secondary cells belonging to the secondary cell group.

9. The (UE) according to claim 6, wherein the first UCI and the second UCI are not allowed to be transmitted simultaneously on a single physical uplink channel.

10. The (UE) according to claim 6, wherein the processor is further configured to drop transmission of a third UCI when the transmission of the third UCI is configured on the first cell group or the second cell group in the subframe n and the third UCI has a lower priority than the first UCI and the second UCI.

11. A method for receiving, by a base station (BS), uplink control information (UCI) from a user equipment (UE), the method comprising:

transmitting, through at least one of a plurality of cell groups for the UE, uplink configuration information on a plurality of UCIs configured to be received in subframe n; and receiving at least a first UCI with a highest priority and a second UCI with a second highest priority among the plurality of UCIs in the subframe n based on the configuration information, wherein, when reception of the first UCI with the highest priority and reception of the second UCI with the second highest priority are both configured on a first cell group, the first UCI is received on the first cell group in the subframe n, and the second UCI is received on a second cell group other than the first cell group among the plurality of cell groups in the subframe n.

12. A base station (BS) for receiving uplink control information (UCI) from a user equipment (UE), the base station comprising:

a radio frequency (RF) module including a transceiver; and a processor configured to control the RF module, wherein the processor is configured to:

control the RF module to transmit, through at least one of a plurality of cell groups for the UE, configuration information on a plurality of UCIs configured to be received in subframe n; and control the RF module to receive at least a first UCI with a highest priority and a second UCI with a second highest priority among the plurality of UCIs in the subframe n based on the configuration information, wherein, when plurality of the first UCI with the highest priority and plurality of the second UCI with the second highest priority are configured on a first cell group, the first UCI is received on the first cell group in the subframe n, and the second UCI is received on a second cell group other than the first cell group among the plurality of cells in the subframe n.

* * * * *